US009280621B1

(12) United States Patent
Ginetti et al.

(10) Patent No.: US 9,280,621 B1
(45) Date of Patent: Mar. 8, 2016

(54) METHODS, SYSTEMS, AND ARTICLES OF MANUFACTURE FOR ANALYZING A MULTI-FABRIC ELECTRONIC DESIGN AND DISPLAYING ANALYSIS RESULTS FOR THE MULTI-FABRIC ELECTRONIC DESIGN SPANNING AND DISPLAYING SIMULATION RESULTS ACROSS MULTIPLE DESIGN FABRICS

(71) Applicant: Cadence Design Systems, Inc., San Jose, CA (US)

(72) Inventors: Arnold Ginetti, Antibes (FR); Vikas Kohli, Noida (IN); Taranjit Singh Kukal, Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/503,407

(22) Filed: Oct. 1, 2014

Related U.S. Application Data

(60) Provisional application No. 62/033,607, filed on Aug. 5, 2014.

(51) Int. Cl.
*G06F 17/50* (2006.01)

(52) U.S. Cl.
CPC ........ *G06F 17/5022* (2013.01); *G06F 2217/04* (2013.01); *G06F 2217/08* (2013.01); *G06F 2217/38* (2013.01); *G06F 2217/40* (2013.01); *G06F 2217/74* (2013.01)

(58) Field of Classification Search
CPC .................................................. G06F 17/5036
USPC ........................................................ 716/136
See application file for complete search history.

(56) References Cited

U.S. PATENT DOCUMENTS

| 4,457,027 A | 7/1984 | Gladstone |
| 5,396,435 A | 3/1995 | Ginetti |
| 5,426,591 A | 6/1995 | Ginetti et al. |
| 5,633,803 A | 5/1997 | Silve et al. |
| 5,638,290 A | 6/1997 | Ginetti et al. |
| 5,726,902 A | 3/1998 | Mahmood et al. |

(Continued)

OTHER PUBLICATIONS

Hon-Chi Ng, "Cpr E 305 Laboratory Tutorial ¾ Verilog Syntax: Summary of Verilog Syntax" Last Updated: Feb. 7, 2001.

(Continued)

*Primary Examiner* — Suresh Memula
(74) *Attorney, Agent, or Firm* — Vista IP Law Group, LLP

(57) ABSTRACT

Disclosed are techniques to analyze multi-fabric designs. These techniques generate a cross-fabric analysis model by at least identifying first design data in a first design fabric of a multi-fabric electronic design using a first session of a first electronic design automation (EDA) tool, update the cross-fabric simulation model by at least identifying second design data in a second design fabric using a second session of a second EDA tool, and determine analysis results for the multi-fabric electronic design using at least the cross-fabric simulation model. Analysis results may be determined using parasitic, electrical, or performance information. Various EDA tools access their respective native design data in their respective domains or design fabrics and have no access to or visibility of non-native design data while these techniques automatically cross the boundaries between multiple design fabrics to accomplish the tasks of analyzing multi-fabric electronic designs or displaying analysis results therefor.

20 Claims, 11 Drawing Sheets

(56) References Cited

U.S. PATENT DOCUMENTS

| | | | |
|---|---|---|---|
| 5,751,596 A | 5/1998 | Ginetti et al. |
| 5,764,525 A | 6/1998 | Mahmood et al. |
| 5,825,658 A | 10/1998 | Ginetti et al. |
| 5,841,663 A | 11/1998 | Sharma et al. |
| 5,896,299 A | 4/1999 | Ginetti et al. |
| 5,956,257 A | 9/1999 | Ginetti et al. |
| 6,086,621 A | 7/2000 | Ginetti et al. |
| 6,113,647 A | 9/2000 | Silve et al. |
| 6,145,117 A | 11/2000 | Eng |
| 6,170,080 B1 | 1/2001 | Ginetti et al. |
| 6,353,612 B1 | 3/2002 | Zhu |
| 6,378,116 B1 | 4/2002 | Ginetti |
| 6,401,128 B1 | 6/2002 | Stai |
| 6,405,345 B1 | 6/2002 | Ginetti |
| 6,519,743 B1 | 2/2003 | Nauts et al. |
| 6,622,290 B1 | 9/2003 | Ginetti et al. |
| 6,622,291 B1 | 9/2003 | Ginetti |
| 7,143,341 B1 | 11/2006 | Kohli |
| 7,168,041 B1 | 1/2007 | Durrill et al. |
| 7,257,799 B2 | 8/2007 | McKenney |
| 7,468,982 B2 | 12/2008 | Mehra |
| 7,490,309 B1 | 2/2009 | Kukal et al. |
| 7,555,739 B1 | 6/2009 | Ginetti et al. |
| 7,634,743 B1 | 12/2009 | Ginetti |
| 7,779,286 B1 | 8/2010 | Pritchard |
| 7,802,221 B1 | 9/2010 | Brink |
| 7,949,987 B1 | 5/2011 | Ginetti et al. |
| 7,971,175 B2 | 6/2011 | Ginetti et al. |
| 7,971,178 B1 | 6/2011 | Marwah et al. |
| 7,990,375 B2 | 8/2011 | Kohli et al. |
| 8,046,730 B1 | 10/2011 | Ferguson et al. |
| 8,136,071 B2 | 3/2012 | Solomon |
| 8,145,458 B1 | 3/2012 | Kukal et al. |
| 8,191,035 B1 | 5/2012 | Van Brink |
| 8,255,845 B2 | 8/2012 | Ginetti |
| 8,261,228 B1 | 9/2012 | Gopalakrishnan et al. |
| 8,271,933 B1 | 9/2012 | Kohli et al. |
| 8,281,272 B1 | 10/2012 | Ginetti |
| 8,286,025 B1 | 10/2012 | Pritchard |
| 8,286,110 B1 | 10/2012 | Kukal et al. |
| 8,316,337 B2 | 11/2012 | Bhattacharya et al. |
| 8,316,342 B1 | 11/2012 | Kukal et al. |
| 8,347,261 B2 | 1/2013 | Ginetti et al. |
| 8,364,656 B2 | 1/2013 | Arora et al. |
| 8,438,524 B1 | 5/2013 | Kohli et al. |
| 8,452,582 B1 | 5/2013 | Al-hawari et al. |
| 8,453,136 B1 | 5/2013 | Hahn et al. |
| 8,479,134 B2 | 7/2013 | Bhattacharya et al. |
| 8,521,483 B1 | 8/2013 | Kukal et al. |
| 8,527,929 B2 | 9/2013 | Bhattacharya et al. |
| 8,527,934 B2 | 9/2013 | Ginetti et al. |
| 8,566,767 B1 | 10/2013 | Kukal et al. |
| 8,594,988 B1 | 11/2013 | Spyrou et al. |
| 8,631,181 B2 | 1/2014 | Feehrer |
| 8,645,894 B1 | 2/2014 | Kukal et al. |
| 8,656,329 B1 | 2/2014 | Kukal et al. |
| 8,719,754 B1 | 5/2014 | Ginetti |
| 8,732,636 B2 | 5/2014 | Ginetti et al. |
| 8,732,651 B1 | 5/2014 | Kukal et al. |
| 8,762,906 B2 | 6/2014 | Ginetti et al. |
| 8,769,455 B1 * | 7/2014 | Singh et al. ............... 716/108 |
| 8,806,405 B2 | 8/2014 | Colwell et al. |
| 8,898,039 B1 | 11/2014 | Kukal et al. |
| 8,910,100 B1 | 12/2014 | Wilson et al. |
| 8,930,878 B1 | 1/2015 | Leef |
| 2003/0051222 A1 | 3/2003 | Williams et al. |
| 2003/0196182 A1 | 10/2003 | Hahn |
| 2004/0034842 A1 | 2/2004 | Mantey |
| 2004/0156322 A1 | 8/2004 | Mehra |
| 2005/0273732 A1 | 12/2005 | Xu |
| 2006/0111884 A1 | 5/2006 | McGaughy et al. |
| 2007/0229537 A1 | 10/2007 | Kohli et al. |
| 2008/0301600 A1 | 12/2008 | Kumagai |
| 2009/0007031 A1 | 1/2009 | Ginetti et al. |
| 2010/0031209 A1 | 2/2010 | Luan et al. |
| 2010/0115207 A1 | 5/2010 | Arora et al. |
| 2010/0306729 A1 | 12/2010 | Ginetti |
| 2011/0041106 A1 * | 2/2011 | Li et al. ............... 716/106 |
| 2011/0061034 A1 | 3/2011 | Ginetti et al. |
| 2011/0153288 A1 | 6/2011 | Bhattacharya et al. |
| 2011/0153289 A1 | 6/2011 | Bhattacharya et al. |
| 2011/0154276 A1 | 6/2011 | Bhattacharya et al. |
| 2011/0161899 A1 | 6/2011 | Ginetti et al. |
| 2011/0161900 A1 | 6/2011 | Ginetti et al. |
| 2011/0173582 A1 * | 7/2011 | Bhattacharya et al. ....... 716/106 |
| 2012/0047434 A1 | 2/2012 | Ginetti |
| 2013/0097572 A1 | 4/2013 | Ginetti et al. |
| 2013/0246900 A1 | 9/2013 | Ginetti et al. |
| 2013/0290834 A1 | 10/2013 | Ginetti et al. |
| 2014/0123094 A1 | 5/2014 | Colwell et al. |
| 2014/0223402 A1 | 8/2014 | Satou |

OTHER PUBLICATIONS

Stuart Sutherland, "Verilog HDL: Quick Reference Guide" 2001.
"Summary of Verilog Syntax" URL: http://www.verilogtutorial.info/chapter_3.htm, 2007, Accessed on Sep. 2, 2014.
Non-Final Office Action dated Apr. 13, 2015 for U.S. Appl. No. 14/503,408.
Notice of Allowance dated Oct. 29, 2015 for U.S. Appl. No. 14/503,408.
Ex-parte Quayle Action dated Nov. 2, 2015 for U.S. Appl. No. 14/503,404.
Notice of Allowance dated Jan. 22, 2016 for U.S. Appl. No. 14/503,404.
Ex-parte Quayle Action dated Nov. 27, 2015 for U.S. Appl. No. 14/503,404.

* cited by examiner

METHODS, SYSTEMS, AND ARTICLES OF MANUFACTURE FOR ANALYZING A MULTI-FABRIC ELECTRONIC DESIGN AND DISPLAYING ANALYSIS RESULTS FOR THE MULTI-FABRIC ELECTRONIC DESIGN SPANNING AND DISPLAYING SIMULATION RESULTS ACROSS MULTIPLE DESIGN FABRICS

CROSS-REFERENCE TO RELATED PATENT APPLICATIONS

This patent application claims the benefit of U.S. Prov. Patent App. Ser. No. 62/033,607 filed on Aug. 5, 2014 and entitled "METHOD, SYSTEM, AND COMPUTER PROGRAM PRODUCT FOR IMPLEMENTING, VERIFYING, AND/OR ANALYZING A MULTI-FABRIC ELECTRONIC DESIGN SPANNING ACROSS MULTIPLE DESIGN FABRICS". This application is also cross related to U.S. patent application Ser. No. 14/503,408 filed concurrently and entitled "METHODS, SYSTEMS, AND ARTICLES OF MANUFACTURE FOR BACK ANNOTATING AND VISUALIZING PARASITIC MODELS OF ELECTRONIC DESIGNS", U.S. patent application Ser. No. 14/503,403 filed concurrently and entitled "METHODS, SYSTEMS, AND ARTICLES OF MANUFACTURE FOR IMPLEMENTING A MULTI-FABRIC ELECTRONIC DESIGN SPANNING ACROSS MULTIPLE DESIGN FABRICS", U.S. patent application Ser. No. 14/503,404 filed concurrently and entitled "METHODS, SYSTEMS, AND ARTICLES OF MANUFACTURE FOR PROBING OR NETLISTING A MULTI-FABRIC ELECTRONIC DESIGN SPANNING ACROSS MULTIPLE DESIGN FABRICS", and U.S. patent application Ser. No. 14/503,406 filed concurrently and entitled "METHOD, SYSTEM, AND COMPUTER PROGRAM PRODUCT FOR CHECKING, VERIFYING, OR TESTING A MULTI-FABRIC ELECTRONIC DESIGN SPANNING ACROSS MULTIPLE DESIGN FABRICS". The contents of the aforementioned U.S. provisional patent application and U.S. patent applications are hereby incorporated by reference in their respective entireties for all purposes.

BACKGROUND

In conventional electronic designs, the integrated circuits, the IC packaging, and the printed circuit boards are often developed and designed independently. Modern electronic designs often include integrated circuits (ICs), their respective package designs, and a printed circuit board (PCB) incorporating multiple packaged integrated circuits to be developed in a multi-fabric environment. That is, one designer may need or desire to design in the context of the others. For example, the integrated circuit designer may need or desire to implement the integrated circuit design in view of the contexts of the packaging fabric as well as the printed circuit board fabric.

Similarly, a printed circuit board designer may often desire to implement or tune the printed circuit design in the context of the packaging design fabric and/or the integrated circuit design fabric. As a practical example, consider the situation where an advanced package is to be incorporated onto a PCB for a consumer product that is driven by cost considerations and performance. In conventional approaches, device placement and assignment decisions made solely in the context of the chip may yield the ideal chip-level design, these device placement and assignment decisions could nevertheless result in missing the cost or performance goals for the end consumer product. In these convention approaches, the chip-level placement usually dictates, for example, the bump and ball assignments in the downstream fabrics that may result in excessive coupling in, for example, the interfaces and a complex routing scheme that requires additional layers in the package and/or PCB substrates.

Therefore, there exists a need for a multi-fabric design environment that provides a coherent framework to integrate the integrated circuit design fabric, the packaging design fabric, and the printed circuit board fabric in a seamless manner.

SUMMARY

Disclosed are method(s), system(s), and article(s) of manufacture for analyzing a multi-fabric electronic design across multiple design fabrics in one or more embodiments. Some embodiments are directed at methods for analyzing a multi-fabric electronic design across multiple design fabrics. The methods may generate a cross-fabric analysis model by at least identifying first design data in a first design fabric of a multi-fabric electronic design using a first session of a first electronic design automation (EDA) tool; update the cross-fabric simulation model by at least identifying second design data in a second design fabric using a second session of a second EDA tool; and determine analysis results for the multi-fabric electronic design using at least the cross-fabric simulation model.

In some embodiments, these methods may further determine information for the multi-fabric electronic design in response to a request for determining the analysis results, wherein the information includes at least parasitic information, electrical information, or performance information. In some of these embodiments, these methods may also update the cross-fabric analysis model based at least in part upon the information, wherein the first design data are native to the first EDA tool and non-native to the second EDA tool, and the second design data are native to the second EDA tool and non-native to the first EDA tool. In some embodiments, the second design data are non-native to and cannot be accessed by the first EDA tool without transforming the second design data, and the first design data are non-native to and cannot be accessed by the second EDA tool without transforming the first design data.

In addition or in the alternative, the first EDA tool has no visibility of the second design data in the second design fabric, and the second EDA tool has no visibility of the first design data in the first design fabric. The multi-fabric electronic design does not satisfy one or more design rules or constraints before the request for processing the multi-fabric electronic design is fulfilled, and the multi-fabric electronic design includes a partial, incomplete design that includes no design data for at least one design component in some of these embodiments. Some of these methods may include the acts of receiving a request for determining the analysis results for the multi-fabric electronic design or a portion thereof; and analyzing the multi-fabric electronic design or the portion thereof by using the cross-fabric analysis model in response to the request.

In some embodiments, these methods may receive a request for displaying the analysis results for the multi-fabric electronic design; and identify one or more circuit components across multiple design fabrics in the multi-fabric electronic design in response to the request for displaying the analysis results. In some of the immediately preceding embodiments, these methods may determine at least one model for the one or more circuit components, wherein the at least one model comprises a complex model. In addition or in the alternative, these methods may determine an analysis profile for the at least one model or the one or more circuit components; and identify the analysis results that are associated with the one or more circuit components or with the at least one model by using at least the profile.

Some of these embodiments may further identify the analysis results for the one or more circuit components by using the first EDA tool and the second EDA tool, and generate a display for at least a part of the analysis results in response to the request for displaying the analysis results. These techniques may also identify first pertinent design data for the first design data native to the first session of the first EDA tool, identify second pertinent design data for the second design data native to the second session of the second EDA tool, and transmit or expose at least a part of the first pertinent design data from the first session of the first EDA tool to the second session of the second EDA tool or at least a part of the second pertinent design data from the second session of the second EDA tool to the first session of the first EDA tool.

In some of these immediately preceding embodiments, the methods may cross analyze the multi-fabric electronic design by using at least some of the first pertinent design data and the second pertinent design data, associate at least a first part of the analysis results for the first pertinent design data with one or more first symbolic representations of the first pertinent design data in the second session of the second EDA tool, and associate at least a second part of the analysis results for the second pertinent design data with one or more second symbolic representations of the second pertinent design data in the first session of the first EDA tool.

In addition or in the alternative, these methods may refine at least a first part of the analysis results in the first design fabric and/or the second design fabric by using at least the first part of the analysis result associated with the one or more first symbolic representations based at least in part upon the first pertinent design data and the second pertinent design data, and refine at least a second part of the analysis results in the first design fabric and/or the second design fabric by using at least the second part of the analysis result associated with the one or more second symbolic representations based at least in part upon the first pertinent design data and the second pertinent design data.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
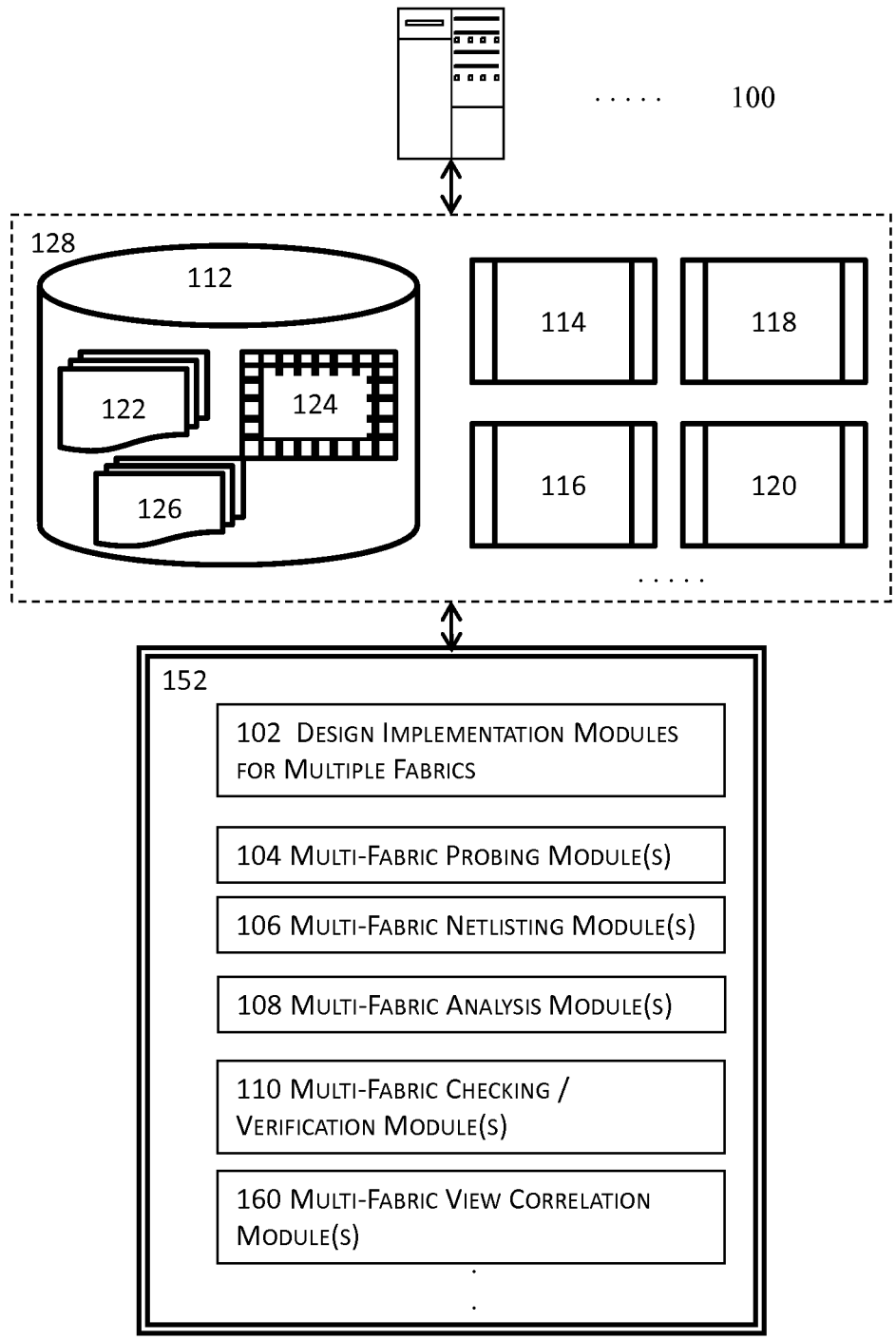
FIG. 1 illustrates a high level flow diagram of a method or system for analyzing a multi-fabric electronic design and viewing analysis results across multiple design fabrics in some embodiments.

Various embodiments of the invention are directed to methods, systems, and articles of manufacture for implementing, verifying or checking, and analyzing a multi-fabric electronic design across multiple design fabrics. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Various embodiments perform planning and/or implementation of electronic designs across multiple fabrics within the context of each other to ensure proper performance as well as flexibility to work at a coarse level to establish initial placement then refine down to the individual byte lanes as a design emerges. In addition, these embodiments provide designers with the capability to quickly effectuate design changes (e.g., placement and net changes) in one fabric and immediately see the impact on adjacent fabrics by uniting design information or data of various sources and formats across multiple fabrics at various granularities and also by communicating data back and forth for the design implementation tools (e.g., electronic design automation or EDA tools) in multiple design fabrics to complete their respective designs.

In various embodiments, various techniques described herein are not limited to planning or implementation of electronic designs across multiple design fabrics but also across multiple design domains. For example, these techniques provide the capabilities of planning and implementation of an IC layout design in the IC layout domain of the IC design fabric in light of a PCB schematic design in the PCB schematic design domain of the PCB design fabric such that designers may implement the IC layout while, for example, knowing the impact of the IC layout design and the PCB schematic design on each other in some embodiments.

These techniques may also provide the capabilities of planning and implementation of an IC packaging layout design in the IC packaging layout domain of the IC packaging design fabric in light of a test bench layout in the test bench layout design domain of the test bench design fabric such that designers may implement the IC packaging layout while, for example, knowing the impact of the test bench layout design and the IC packaging layout design on each other in some embodiments. As another example, some techniques described herein may properly map and check IC layout IOs (inputs/outputs) concurrently. As yet another example, some techniques described herein allow the concurrent implementation of IC logical-schematic symbol pins and IC schematic interfaces within the context of each other. Some techniques described herein allow concurrent implementation of IC physical-schematic symbol pins to IC layout IO pins within the context of each other.

These embodiments establish the relationship between the chip, chip package, the board, and the test bench by using hierarchy management techniques to establish and manage the relationships among the fabrics to enable representations of the complete system from the chip-level to the PCB (printed circuit board), while maintaining the integrity of individual design fabrics and providing simultaneous access to domain-specific and/or design fabric-specific data (e.g., macro placement, I/O pad ring devices, bump patterns, ball pad assignments, and placement of critical PCB components and connectors, etc.) These embodiments manage and manipulate a range of multi-fabric data at various stages of completeness of the design, and adapt as portions of the design become less abstract or more complete during the planning and/or implementation process.

In some embodiments, the techniques and methodologies described herein provide a multi-fabric design environment in an efficient and cost effective manner. One embodiment may implement such a multi-fabric design environment including various details of the packaging design and the printed circuit board design at different abstraction or hierarchical levels with different granularities in one or more integrated circuit design tools (e.g., a layout editor or a schematic editor). Such an implementation may leverage the editing, simulation, checking, verifying, testing, and analysis capabilities of the one or more integrated circuit design tools.

Some embodiments may use different sets of design constraints or design rules (e.g., constraints or rules for a die design versus constraints or rules for a printed circuit board design) or even different domains of characteristics (e.g., electrical characteristics of electronic circuit designs versus physical characteristics of packaging or printed circuit board designs) of integrated circuit designs, packaging designs, and printed circuit board designs in performing various functions or acts described herein. Some other embodiments use a single unified set of design constraints or design rules or a single, unified data structure that has one or more common formats to accommodate different domains of characteristics in performing the functions or acts described herein.

Yet some other embodiments use two or more sets of views for different abstraction levels of the integrated circuit designs, the packaging design, and the printed circuit design. The two or more sets of views for different abstraction levels may include, for example, a set of symbolic views and a set of schematic views or layout views in some of these embodiments. A symbolic view of a block of circuit elements may include a symbol or a place holder for the block and may or may not have the correct dimensions to represent the actual area occupied by the block of circuit elements. A symbolic view of a block of circuit elements may also include some interface information such as the types of ports, terminals, pins, or pads (collectively ports hereinafter) interfacing with external circuit elements, the number of each type of ports, or the identification of each port in some embodiments. In some of these embodiments, a symbolic view of a block of circuit elements may further include the correct dimensions or location of at least one port interfacing with external circuitry. In these aforementioned embodiments, a symbolic view of a block of circuit elements includes some design data of the block at its boundary (e.g., data or information about the interface to external circuit components) yet does not include detailed design data for circuit components inside the boundary of the block.

In some embodiments, a symbolic view of a block of circuit component designs and the corresponding one or more schematic views and/or one or more corresponding layout views of the block at one or more granularities or hierarchical levels may be stored in one or more data structures such that various processes, systems, modules, or even the designers may access any such schematic or layout at the desired granularity or hierarchical level automatically, manually, interactively, or on demand. The two or more sets of view may further include other views such as layout views, gate level views, etc. at various other abstraction levels. With these two or more sets of views, these embodiments provide each design tool in each fabric with the appropriate set of views such that the design tool can properly perform its dedicated functionality.

A multi-fabric electronic design may have a hybrid hierarchy including a plurality of design fabrics, some of which may be included in others to form a hierarchical structure. For example, a PCB design may exist at a first hierarchical level in the PCB design fabric. The PCB design may further include an IC package which exists at a second hierarchical level under the first hierarchical level, and the IC package design may belong to the package design fabric. The IC package design may further include the IC design at a third hierarchical level for the IC design fabric under the second hierarchical level, at which the IC package design is situated. Unlike conventional hierarchical designs, the designers are not freely to ascend or descend the hierarchical structure because designs in different design fabrics may be described in different languages or formats and thus do not communicate with each other to provide the freedom for designers to freely move from one design fabric in one EDA tool session to another design fabric in another EDA tool session.

For example, some embodiments may provide the integrated circuit schematic view including the schematic design of a cell to the schematic editor or a schematic simulator such that the schematic editor may properly implement or simulate the schematic design represented by the integrated circuit schematic view. As another example, these embodiments may further provide a schematic view including the schematic design of a printed circuit board or an IC packaging design to the printed circuit board schematic editor or IC packaging schematic editor, respectively. These two or more sets of views may be stored in parallel and linked automatically in a streamline fashion such that a designer may navigate among different abstraction levels at various granularity levels. Moreover, various views at various granularity levels in different design fabrics may be tracked using one or more data structures that link, for example, a specific view (e.g., a schematic view of a cell) to the appropriate information or data (e.g., schematic design data of the cell). These one or more data structures may be of the same format or of different formats.

In addition or in the alternative, some embodiments may further provide symbolic views of circuit block designs or portions thereof to an electronic circuit design tool that performs its dedicated or intended functions in light of one or more other designs in one or more other fabric(s) as represented by the symbolic views. For example, the integrated circuit designer may use the integrated circuit schematic editor or simulator or layout editor to implement the physical design of an IC in light of the IC packaging design fabric and/or the printed circuit board design fabric. These embodiments may then provide the IC packaging design as a symbolic IC packaging design view and/or the printed circuit board design as a symbolic printed circuit board design view to the IC designer such that the IC designer may implement the IC design within the context and in light of the pertinent information of the IC packaging and/or the printed circuit board design.

Similarly, the IC packaging designer may also be provided with a symbolic integrated circuit design view for the integrated circuit design having sufficient design information or data for the IC packaging designer to implement or tune the IC packaging design in the context of the integrated circuit design. Each design tool therefore sees what the design tool needs to perform its intended or dedicated functions and is not burdened with unnecessary information that may adversely impacts the performance, effectiveness, and/or functionality of the design tool, while still receiving sufficient information or data from other fabrics or abstraction levels to aid the designer in using the design tool to implement or tweak the respective designs.

It shall be noted that the term "symbolic view" and "symbolic representation" may be used interchangeably throughout the application, unless otherwise specifically recited or claimed. In the above example, the symbolic representation of the printed circuit board may also include some electrical data, characteristics, or parasitics (e.g., power, voltages, currents, resistances, etc.) and/or some physical data or characteristics (e.g., temperature, thermal resistance, thermal RC circuits, etc.) such that the test bench design may be edited, analyzed, and/or simulated in the electrical domain, the physical domain, or both the electrical and physical domains. In some embodiments, the first representation may be generated or identified for an EDA tool that may include, for example, at least one of an integrated circuit schematic design tool, an integrated circuit physical design tool, and an integrated circuit design simulation tool.

In some of these embodiments where the first representation already exists, the method or system may identify the existing, first representation. In some other embodiments where the first representation does not exist, the method or system may generate the first representation. For example, the multi-fabric electronic design may include a test bench design in an IC schematic editor (the first EDA tool in this example). The test bench design includes a printed circuit board in the form of a symbolic PCB representation and one or more interconnections and/or one or more discrete components.

The detailed schematic or layout design data of the printed circuit board may be implemented in a PCB design editor and further include one or more IC packaging designs, one or more interconnections and/or one or more discrete components at the PCB level or in the PCB design fabric. Each IC packaging design may further include the die in the form of a symbolic die representation as well as one or more interconnections between the package design and the die and the package design at the IC packaging design level or in the IC packaging design fabric. The package design and the one or more interconnections between the package design and the die may be generated by and native to an IC packaging design tool.

Within the context of analyzing or simulating a multi-fabric electronic design, the method or system may provide the capability of sweeping IC devices in order to optimize the IC devices within the context of the IC package design or the PCB design. The method or system described herein may also provide the capability of sweeping the circuit components (e.g., the interconnects, discrete devices, etc.) in the IC package design or the PCB design to optimize the IC package design or the PCB design within the context of the IC.

For example, some embodiments may modify the design data of a multi-fabric electronic design with the context of each other. In these embodiments, various techniques described herein may be utilized to, for example, rearrange, fix, improve, or optimize design data based at least in part upon one or more rules, requirements, constraints, preferences, and/or objectives in one design domain in one design fabric in light of the other rules, requirements, constraints, preferences, and/or objectives for the design data in one or more other design fabrics. For example, some techniques described herein may optimize or otherwise modify the PCB design or IC package design (e.g., optimize the interconnects and/or discrete devices in the PCB design) based on some rules, requirements, constraints, preferences, and/or objectives in the PCB design fabric or in the IC package design fabric.

These techniques may determine the impact of such intermediate or final modification or optimization in the PCB design fabric or IC package design fabric may be communicated to one or more other design fabrics (e.g., the IC design fabric) by using various methodologies described herein such that design data in various design domains in these one or more other design fabrics may also be modified or optimized either concurrently or accordingly. The modification or optimization to the design data in the various design domains in one or more other design fabrics may further be communicated back to the PCB design tool or the IC package design tool to examine the impact of the modification or optimization in these one or more design fabrics on the PCB or IC package design.

This modification or optimization process may be iteratively performed until both the PCB design in the PCB design fabric (or the IC package design in the IC package design fabric) and the designs in the one or more other design fabrics (e.g., the IC design fabric) are both modified or optimized in some embodiments. In some other embodiments, this modification or optimization process may be performed across multiple design fabrics either concurrently or sequentially, and the respective impacts of the modification or optimization on these multiple design fabrics may be examined on a sliding scale such that the method or system may achieve a final multi-fabric electronic design that better or best accommodates various rules, requirements, constraints, preferences, and/or objectives across these multiple design fabrics. For example, the method or system may favor the optimization or modification on the IC design while deemphasizing one or more rules, requirements, constraints, preferences, or objectives in one or more other design fabrics when the performance or manufacturability of the IC is more critical.

In the context of analysis or simulation (e.g., simulations with complex models such as s-parameter models or SPICE sub-circuits), the analysis engine may determine the modification or optimization in one design domain in a design fabric as the intermediate or final output of the analysis. The intermediate or final output may be determined in a form of, for example, input values, initial conditions, and/or boundary conditions that may be communicated to the EDA tool(s) to analyze the respective design data in one or more design fabrics. In some embodiments where the analysis or simulation uses a netlist of the multi-fabric electronic design as an input, various techniques may sweep the IC devices in the IC design fabric to optimize the IC design in light of the IC package design and/or the PCB design. Similarly, various techniques may also sweep the circuit components (e.g., interconnects and discrete devices) in the IC package design or the PCB design to examine, for example, the waveform output or the state information of these circuit components to optimize these circuit components in light of the IC design.

Moreover, some embodiments may sweep one or more circuit components in a design fabric of a plurality of design fabrics of a multi-fabric electronic design by performing one or more analyses for either the design in the design fabric or for the multi-fabric electronic design within the context of one or more other design fabrics. For example, these embodiments may vary one or more property values of one or more circuit components (e.g., the resistance of a resistor, the capacitance of a capacitor, the inductance of an inductor, etc.) in a PCB or an IC package design and perform an analysis for each property value combinations. These embodiments may further utilize various techniques described herein to determine the impact of the analysis on the PCB or an IC package design in one or more other design fabrics (e.g., an IC design fabric). Some of these embodiments may use a parameterized model to represent a circuit component.

These embodiments may thus sweep, for example, one or more discrete devices in the PCB or an IC package design within the context of the IC design. Similarly, some embodiments may also sweep one or more circuit components in an IC design within the context of the IC package design and/or the context of the PCB design. With the capability of analyzing multi-fabric electronic designs with sweeping circuit components in a design fabric within the context of one or more other design fabrics, the IC design or the device parameters thereof can be optimized within the context of the IC package design and/or the context of the PCB design. Similarly, the device or component parameters of an IC package design or the PCB design may also be optimized with the context of each other and/or further within the context of the IC design. In some embodiments, a circuit model may further correspond to multiple models or representations having different values for one or more parameters or properties.

In addition to implementing or tweaking (e.g., fixing, improving, or optimizing) a design at a particular abstraction level in a specific fabric, another advantage of these embodiments is that a design team working in different geographies may transmit some form of abstracted design information or data from a first team member (e.g., an IC designer) working in a first fabric at the first location to a second team member (e.g., an IC packaging designer) working in a second fabric at a second location. The second team member may not only implement or tweak his or her own design within the context of the design in the first fabric but also revise and transmit the abstracted design back to the first team member who may in turn accept, partially accept, or reject the revised abstracted design.

Yet another advantage of these embodiments is that these embodiments may better manage large block or cell symbols by splitting a large symbol into multiple split symbols and placing its ports across design schematics, especially near the circuitry to which they are connected. As the complexity of the designs is constantly increasing and more and more logic is being placed inside hierarchical blocks, the number of interfaces that are exposed by the hierarchical block has increased dramatically such that the increased number of interfaces means more pins are required on the block symbol. As a result, a block symbol may become so large (e.g., a device having a large pin count) that it may not be placed on a standard page border. Such a large block symbol (or a block symbolic representation) may also become difficult to manage because of the sheer number of pins coming out of the same symbol.

Various embodiments described herein also better manage hierarchical block symbols by splitting these symbols into multiple split symbols. Rather than generating a big monolithic symbol, these embodiments provide an option to split the ports of a hierarchical block over multiple symbols. Splitting a large symbol into multiple split symbols reduces the size of the large symbol. In addition, these embodiments may logically categorize the ports and placed these ports on different symbols to create symbols that may be placed across, for example, schematic sheets, especially near the circuitry to which they connect to. In splitting a larger symbol or representation into multiple, smaller symbols or representations, an identification (e.g., a name or other types of identifier) may also be split into multiple split identifications corresponding to the multiple, smaller symbols.

In one or more embodiments, FIG. 1 shows an illustrative high level schematic block diagrams for implementing a multi-fabric electronic design across multiple design fabrics and may comprise one or more computing systems 100, such as a general purpose computer described in the System Architecture Overview section to implement one or more special proposes. In some embodiments, the one or more computing systems 100 may invoke various system resources such as the processor(s) or processor core(s), memory, disks, etc.

The one or more computing systems 100 may also initiate or interact with other computing systems to access various resources 128 that may comprise a floorplanner, a global routing engine, and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), electronic circuit design specification database(s), various statistics, various data, rule decks, various design rules, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof in a multi-fabric design environment 152 that may comprises a plurality of design implementation modules 102 (e.g., schematic design tool, layout tool, etc.) to insert, remove, modify, improve, optimize, or otherwise operate upon designs in different fabrics (e.g., the die design fabric, the integrated circuit or IC packaging design fabric, the printed circuit board or PCB design fabric, the test bench design fabric, etc.), one or more multi-fabric probing modules 104 to probe multi-fabric designs across multiple design fabrics, one or more multi-fabric netlisting modules 106 to netlist multi-fabric designs across multiple design fabrics, one or more multi-fabric analysis modules 108 to simulate or analyze multi-fabric design across multiple design fabrics, one or more check or verification modules 110 to check or verify the correctness of multi-fabric designs across multiple design fabrics, and one or more multi-fabric view correlation modules 160 to correlate various symbolic views, schematic views, and/or layout views with the schematic design data or the layout data in different design fabrics at various hierarchical levels, etc.

In some embodiments, a symbolic view may be stored or linked together with a schematic view or layout view of a circuit component, block, or cell by using, for example, a profile. The profile may further include or be associated with other information or data including, for example, parasitic information (e.g., capacitances, resistances, etc.), electrical information (e.g., currents, voltages, inductances, etc.), physical information (e.g., sizes or profiles of various shapes, etc.), timing or delay information of the electronic design of interest, other performance-related information, analysis results (e.g., EMI or electromagnetic interference analyses, ISI or inter-symbol interference analyses, cross-talk analyses, etc.), simulation results in various domains and/or fabrics, or any combinations thereof in some of these embodiments. The multi-fabric view correlation module 160 may also correlate the aforementioned information or data with the multi-fabric electronic design, a portion thereof, or the corresponding designs of circuit component in the multi-fabric electronic design. In some embodiments, the multi-fabric view correlation module 160 may further annotate the pertinent portions or circuit component designs with some or all of the aforementioned information or data.

Figure 2A:
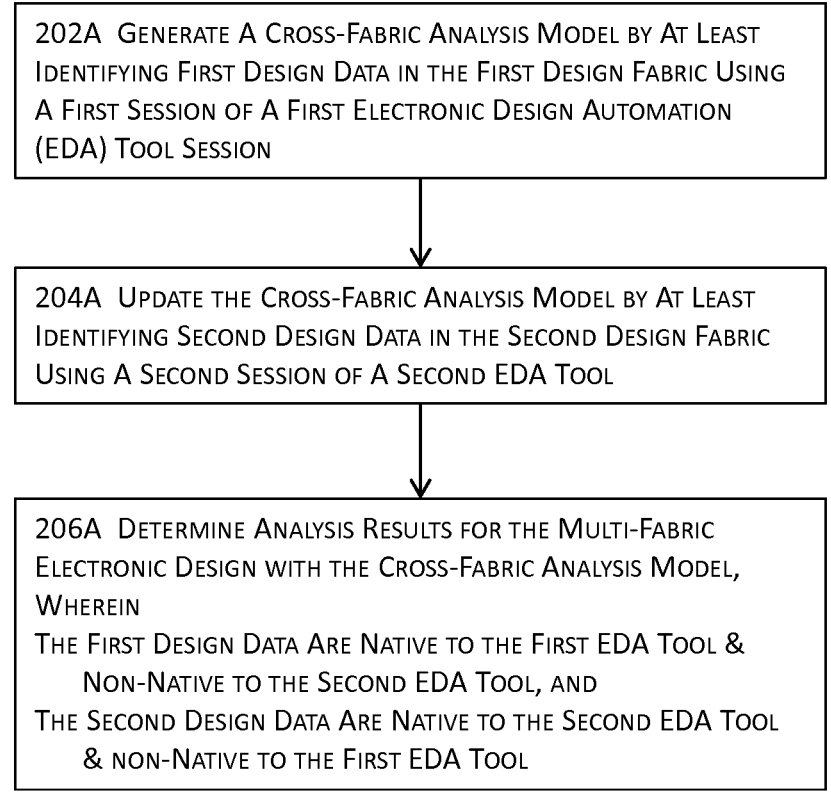
FIG. 2A illustrates a high level flow diagram of a method or system for analyzing a multi-fabric electronic design and viewing analysis results across multiple design fabrics in some embodiments.

FIG. 2A illustrates a high level flow diagram for a method or system for analyzing a multi-fabric electronic design and viewing analysis results across multiple design fabrics in some embodiments. In these embodiments, the method or system may generate a cross-fabric analysis model by at least identifying first design data in a first design fabric of a multi-fabric electronic design by using a first electronic design automation (EDA) tool session at 202A. Design fabrics may include, for example but not limited to, a test bench design fabric, a printed circuit board (PCB) design fabric, an integrated circuit (IC) packaging design fabric or a packaging design, and IC design fabric (or die design fabric). Each design fabric corresponds to one or more EDA tools and houses design data that are may be natively generated, edited, accessed, or otherwise maintained by these one or more EDA tools.

An EDA tool corresponding to a design fabric may thus natively access design data in the design fabric, without performing or requiring any transformations, mappings, translations, or compilations to transform, map, translate, or compile the design data into a format recognizable by the EDA tool. On the other hand, an EDA tool has no knowledge and thus does not understand design data that are non-native to the EDA tool. In some embodiments, the EDA tool does not even have visibility of such non-native design data. For example, a PCB tool may not have visibility of IC packaging design data that belong to the IC packaging design fabric. The cross-fabric analysis model may include, for example but not limited to, an input representing the multi-fabric electronic design or a portion thereof to an analysis engine or a simulator. For example, a cross-fabric analysis model may include a netlist that may be used by, for example, a SPICE (Simulation Program with Integrated Circuit Emphasis) or SPICE-like simulator for simulation.

A cross-fabric analysis model may also include models ranging from transistor models to complex models including, for example, s-parameter models, IBIS (Input Output Buffer Information Specification) models, SPICE sub-circuit models, etc. The types of analyses that may be performed in various embodiments described herein include various simulations such as general purpose circuit simulations (e.g., SPICE or SPICE-like simulations), digital simulations, and analog mixed-signal (AMS) simulations across multiple design fabrics. The types of analyses may further include RF simulations, Verilog- or HDL (Hardware Description Language)-based simulations, simulations, simulations with complex models (e.g., s-parameter models, SPICE sub-circuit models, or PCB simulation models such as transmission lines and IBIS models across multiple design fabrics in some embodiments. The types of analyses may also include analyses other than simulations such as signal integrity analyses, timing analyses, etc. across multiple design fabrics. For example, the method or system may identify a partial netlist of a first design fabric at 202A and generate a partial netlist that may be subsequently aggregated or combined in a netlist that may be used as an input to a simulator. More details about generating a netlist for a multi-fabric electronic design are described in U.S. patent application Ser. No. 14/503,407 filed concurrently and entitled "METHODS, SYSTEMS, AND ARTICLES OF MANUFACTURE FOR ANALYZING A MULTI-FABRIC ELECTRONIC DESIGN SPANNING AND DISPLAYING SIMULATION RESULTS ACROSS MULTIPLE DESIGN FABRICS", the content of which is hereby expressly incorporated by reference in its entirety for all purposes.

At 204A, the method or system may update the cross-fabric analysis model by at least identifying second design data in a second design fabric using a second session of a second EDA tool. The second session of the second EDA tool may be identified or instantiated by the first session of the first EDA tool by using, for example, a request for action. In the above simplified example of generating a netlist as a simulator input, the method or system may further update the netlist with the partial netlist identified in the second design fabric, and the netlist will include both the partial netlist for the first design fabric and the partial netlist for the second design fabric. In some embodiments where the analysis models includes complex models (e.g., SPICE or SPICE-like sub-circuits, s-parameter models, IBIS models, transmission lines, etc.), the method or system may use EDA tools to generate the complex models from their respective design fabrics that include design data that are native to the corresponding EDA tools.

For example, the method or system may use an IC design tool to extract and generate SPICE sub-circuits in the IC layout domain of the IC design fabric. As another example, the method or system may use a PCB design tool to generate a complex model by referencing the PCB schematic or the PCB layout in the PCB design fabric. In some embodiments, the method or system may represent the first design data and the second design data in a common format (e.g., an electronic design interchange format or EDIF) or any other format that is recognizable by the subsequent analysis engine or simulator for analyzing the multi-fabric electronic design.

At 206A, the method or system may determine the analysis results for the multi-fabric electronic design with the cross-fabric analysis model. In some embodiments where the analysis has already been performed with the desired input for the multi-fabric electronic design or the desired portion thereof, the method or system may directly identify the analysis results from the previously performed analysis at 206A. In some embodiments where the analysis has not been performed, the method or system may perform the analysis with the desired input for the multi-fabric electronic design or the desired portion thereof at 206A to determine the analysis results. More details about performing the analysis to determine the analysis results are described subsequently with reference to FIGS. 2B-F.

In some embodiments, the first design data are native to the first EDA tool and non-native to the second EDA tool. In addition or in the alternative, the second design data are native to the second EDA tool and non-native to the first EDA tool. The first EDA tool may include any EDA tools (e.g., a schematic editor, a schematic simulator, a layout tool, a physical verification tool, a design rule check (DRC) tool, etc.) for natively accessing design data in any design domains (e.g., schematic, layout, etc.) of an integrated circuit design fabric, any EDA tools in a packaging design fabric, any EDA tools in a printed circuit board design fabric, or any EDA tools in the test bench design fabric.

An EDA tool may natively access design data or any other data if the EDA tool may be used to generate, access, and/or maintain the design data without performing any transformation, mapping, export, or abstraction (collectively transform or transformation) on the design data in some embodiments. In some of these embodiments, only design data that are native to an EDA tool are visible to and accessible by the EDA tool. In these embodiments, design data are non-native to an EDA tool if the EDA tool cannot access the design data without performing some transformation, exportation, or mapping on the design data. In some of these embodiments, design data that are non-native to an EDA tool are invisible to and hence inaccessible by the EDA tool.

Processing native design data with respective EDA tools provides an advantage of not having to generate more than one representation of the same set of design data for analyzing any portion of a multi-fabric electronic design. Another advantage is that design data need not be protected by, for example, read-only access because no design data need to be shared between two EDA tools so there will be no concurrent access to the same piece of design data to cause inconsistencies. This native access is in sharp contrast with conventional, collaborative design environments where some design data are shared between two or more circuit design tools and thus need protection such as read-only access for the shared design data.

The read-only access to some design data in the conventional approaches hinders the ability of cross-improve or cross-optimize such design data within the context of other design data in one or more other design fabrics. The read-only access to some design data may further hinder the ability of improve or optimize other design data within the context of the read-only protected design data. Using respective EDA tools to process their respective native design data as described herein may also provide another advantage in that only the EDA tools responsible for creating, modifying, or maintaining the native design data have visibility of the native design data, while the other EDA tools only see, for instance, one or more symbolic views or representations of such design data, instead of different representations of the same design data. In these embodiments, design data of a circuit component exist in one and only one design fabric and are visible only to the EDA tools to which the design data are native.

When an EDA tool encounters non-native design data, the EDA tool may instantiate a symbol or invoke a native EDA tool to instantiate a symbol (e.g., by using a request for action) for the non-native design data and has no knowledge or visibility of the actual design data in these embodiments. In some of these embodiments, the EDA tool may nevertheless expose at least the pertinent information including the pertinent connectivity information (e.g., which net or net segments are connected to the symbolic view, or which net or net segments are connected to corresponding ports of the symbolic view, etc.) to a non-native EDA tool. When an EDA tool encounters non-native design data, the EDA tool does not need to have any knowledge or even visibility of the actual, non-native design data (e.g., schematic instances, layout shapes, other design related information, etc.) because such actual design data may be processed, when needed or desired, by the corresponding EDA tools to which the actual design data are native.

In some embodiments, the method or system described herein may be made aware of which design fabric a design component belongs to, which EDA tools are to be invoked or instantiated to natively process the actual design data of the design component, the corresponding symbolic view of a design component or block, the source and destination of the request for action, details about the action in the request for action, prior manipulation or modification of the design component, or any combinations thereof. This can be accomplished by referring to an appropriate data structure including, for example, design data and their respective layers, domains, hierarchical levels, and/or design fabrics.

Figure 2B:
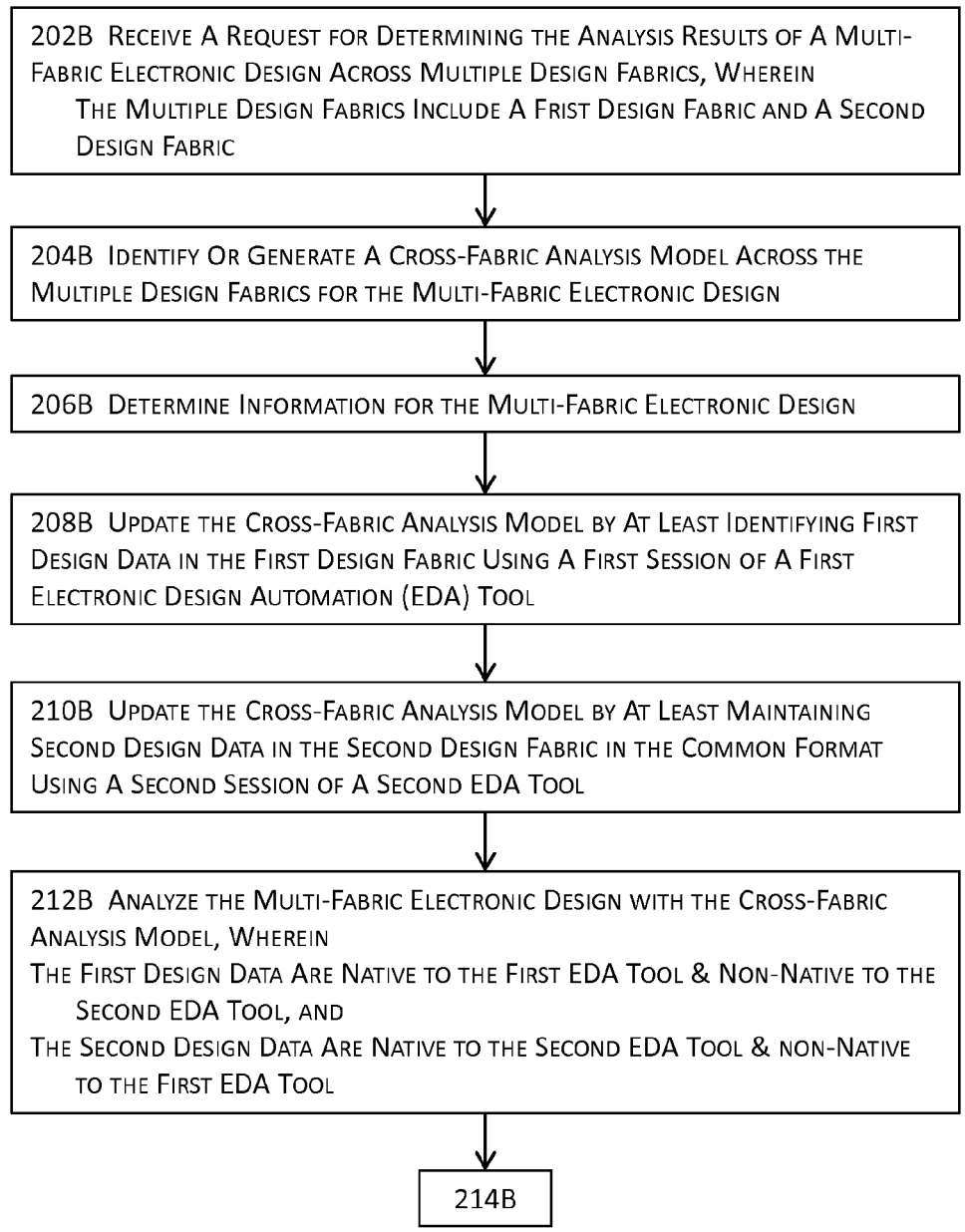
FIGS. 2B-C jointly illustrate a more detailed flow diagram of a method or system for analyzing a multi-fabric electronic design and viewing analysis results across multiple design fabrics in some embodiments.
Figure 2C:
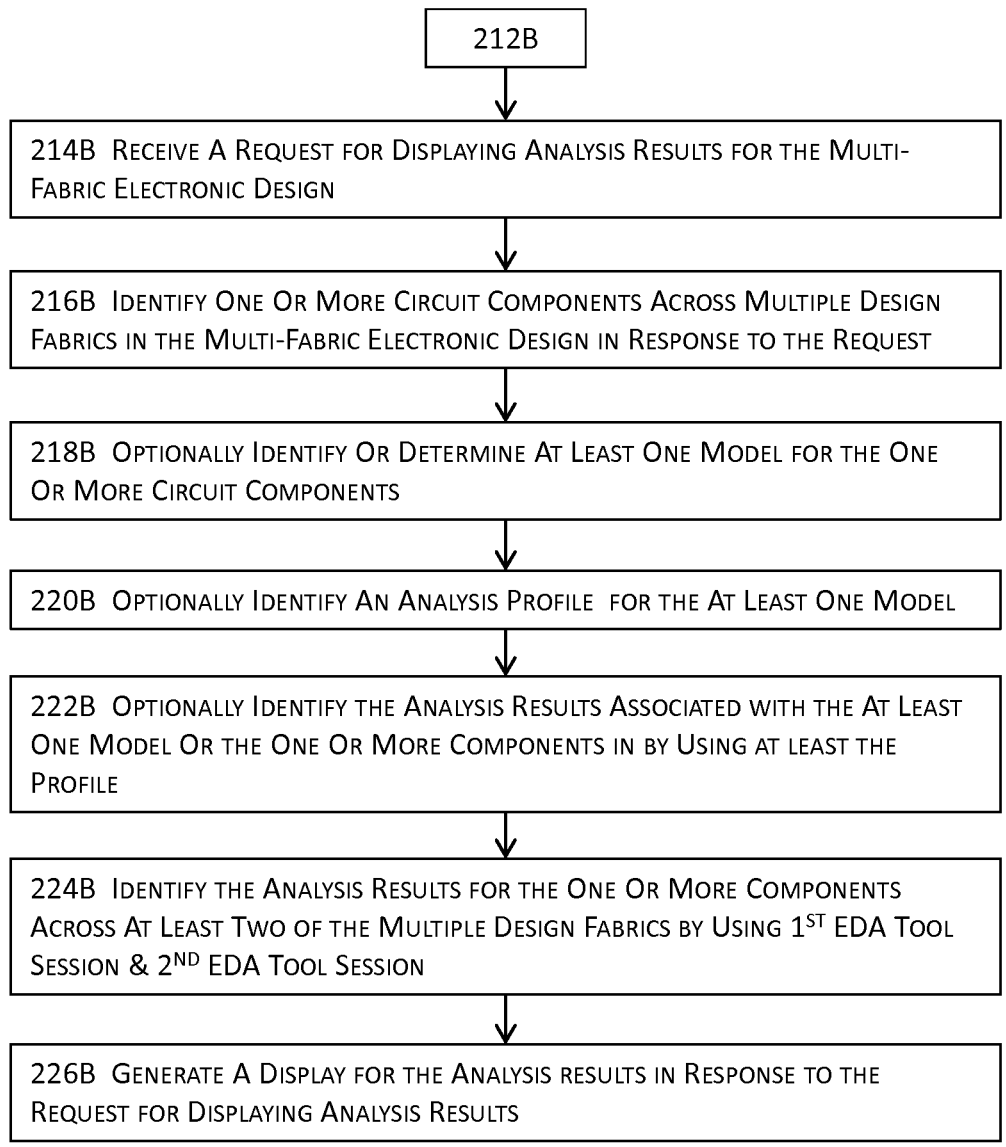

FIGS. 2B-C jointly illustrate a more detailed flow diagram for a method or system for analyzing a multi-fabric electronic design and viewing analysis results across multiple design fabrics in some embodiments. In these embodiments, the method or system may receive a request for determining the analysis results of a multi-fabric electronic design or a portion thereof across multiple design fabrics at 202B. In these embodiments, the multiple design fabrics may include a first design fabric and a second design fabric. In some embodiments where the analysis with the desired input for the multi-fabric electronic design or the desired portion thereof has been performed, the method or system may identify the analysis results for the previously performed analysis to fulfill the request.

In some other embodiments where the analysis has not been performed with the desired input for the multi-fabric electronic design or the desired portion thereof, the method or system may proceed to 204B. At 204B, the method or system may identify (if pre-existing) or generate (if non-existing) a cross-fabric analysis model across the multiple design fabrics for the multi-fabric electronic design in identical or substantially similar manners described for 202A of FIG. 2A. The method or system may further determine information that may be referenced or used in analyzing the multi-fabric electronic design at 206B.

The information may include, for example, parasitic information (e.g., capacitances, resistances, etc.), electrical information (e.g., currents, voltages, inductances, etc.), physical information (e.g., sizes or profiles of various shapes, etc.), and/or performance information including timing or delay information of the electronic design of interest, other performance-related information, analysis results (e.g., EMI or electromagnetic interference analyses, ISI or inter-symbol interference analyses, cross-talk analyses, etc.), simulation results in various domains and/or fabrics, or any combinations thereof in some of these embodiments. At 208B, the method or system may update the cross-fabric analysis model by at least identifying first design data in the first design fabric using a first session of a first EDA tool.

In these embodiments, the method or system may generate the cross-fabric analysis model at 202B and continue to update the cross-fabric analysis model at 208B and 210B with requisite design data (e.g., partial netlisting, complex models, etc.) from the multiple design fabrics. At 210B, the method or system may update the cross-fabric analysis model by at least identifying second design data in the second design fabric using a second session of a second EDA tool. The second session of the second EDA tool may be identified (if pre-existing) or instantiated (if non-existing) by another EDA tool session (e.g., the first session of the first EDA tool) by using, for example, a request for action.

At 212B, the method or system may analyze the multi-fabric electronic design or the portion thereof with the cross-fabric analysis model. In some of these embodiments, the first design data are native to the first EDA tool and non-native to the second EDA tool, and the second design data are native to the second EDA tool and non-native to the first EDA tool as similarly described above with reference to FIG. 2A. The method or system may further save cross-fabric analysis information in or associate the cross-fabric analysis information with a simulation profile. For example, the cross-fabric analysis information may include or be associated with the multi-fabric electronic design or the portion that is or has been analyzed, the analysis results, the cross-fabric analysis model, various inputs, conditions, values, etc. In some embodiments where the multi-fabric electronic design or the portion thereof has previously been analyzed with the correct cross-fabric analysis model, the method or system may simply retrieve the analysis results, without performing the analysis.

At 214B, the method or system may receive a request for displaying at least a portion of the analysis results for the multi-fabric electronic design. For example, a designer may issue a request for obtaining or determining the voltage values at some nodes in the multi-fabric electronic design, or another computer implemented process may issue a request to determine certain currents or states of some circuit components. The method or system may thus receive such a request at 214B. At 216B, the method or system may identify one or more circuit components across multiple design fabrics in the multi-fabric electronic design in response to the request.

In some embodiments, the method or system may identify the one or more circuit components by using one or more respective EDA tools to which the design data of the one or more circuit components are native. In the above example, the method or system may identify (if pre-existing) or instantiate (if non-existing) one or more EDA tools that may natively access design data of these one or more circuit components at 216B. For example, if the request includes the identification of voltages along a net spanning from the PCB design to an IC design within its IC packaging design, the method or system may invoke the PCB design tool to identify the circuit components in the PCB design fabric, the IC packaging design tool to identify the circuit components in the IC packaging design fabric, and the IC design tool to identify the circuit components in the IC design fabric at 216B.

In these embodiments, the method or system may further identify the elements in the cross-fabric analysis model that correspond to the one or more circuit components. In the alternative, the method or system may examine one or more data structures that store the correlation between the cross-fabric analysis model elements (e.g., models of circuit components) and the actual circuit components in various design fabrics to determine what elements in the cross-fabric analysis model correspond to what the request needs (e.g., identification of voltage values along a net or currents through a net). In some embodiments, the method or system may store the analysis results separately from the multi-fabric electronic design or the cross-fabric analysis model. In some other embodiments, the method or system may store the analysis results in (e.g., by annotation or stitching) or associate the analysis results with (e.g., by using one or more data structures such as some profiles described later to map analysis results to analysis model elements and further to actual circuit component designs) the multi-fabric electronic design or the cross-fabric analysis model.

At 218B, the method or system may optionally identify or determine at least one model for the one or more circuit components. In these embodiments, the method or system may represent these identified one or more circuit components as the at least one model. The method or system may further optionally identify a analysis profile for the at least one extracted model at 220B, and optionally identify the portion of analysis results that is associated with the at least one model or the one or more circuit components by using at least the profile at 222B. A profile may include a file or a data structure (e.g., a table, a database, etc.) that stores data or information about the request in some embodiments. A profile may also include a file or a data structure that stores the links between different pieces of data or information about the request, rather than the data or information about the request.

For example, a profile may store the links to the portion of a multi-fabric electronic design analyzed, the input for the analysis, the cross-fabric model(s) for a particular analysis, the circuit components corresponding to the cross-fabric model(s), etc. in the latter embodiments and the actual pieces of data or information in the former embodiments. In these embodiments where a profile has been used to store or associate analysis results with the cross-fabric analysis model, the multi-fabric electronic design, or even a model therein, the method or system may identify the analysis results of the one or more circuit components or their corresponding at least one model in or with the profile. For example, the method or system may store the analysis results in response to the request for analysis and information about the one or more circuit components (e.g., names or other identifiers) identified for the request in a profile for subsequent retrieval in some embodiments.

In some other embodiments, the method or system does not store the actual analysis results or the information about the one or more circuit components identified for the request in the profile. Rather, the method or system may correlate the actual analysis results or the information about the one or more circuit components identified for the request with the profile for subsequent retrieval. At 224B, the method or system may identify the analysis results for the one or more circuit components across multiple design fabrics by using the first session of the first EDA tool and the second session of the second EDA tool to process their respective, native data or information. As described above, the method or system may store the analysis results separately from the multi-fabric electronic design or the cross-fabric analysis model in some embodiments.

In these embodiments, the method or system may identify the corresponding model elements for the one or more circuit components identified at 216B by using respective, native EDA tools and identify the portion of the analysis results that corresponds to the corresponding model elements. The method or system may then correlate the portion of the analysis results with the one or more circuit components at 224B. In some other embodiments, the method or system may store the analysis results in (e.g., by annotation or stitching) or associate the analysis results with (e.g., by using one or more data structures such as some profiles described later to map analysis results to analysis model elements and further to actual circuit component designs) the multi-fabric electronic design or the cross-fabric analysis model.

In these embodiments, the method or system may look up the portion of the analysis results associated with the model elements that further correspond to the one or more circuit components. The method or system may also optionally annotate the analyzed multi-fabric electronic design or the portion thereof with the analysis results identified at 224B by using respective EDA tools to natively access their corresponding design fabrics. More details about annotating a multi-fabric electronic design are provided in U.S. patent application Ser. No. 14/503,403 filed concurrently and entitled "METHODS, SYSTEMS, AND ARTICLES OF MANUFACTURE FOR BACK ANNOTATING AND VISUALIZING PARASITIC MODELS OF ELECTRONIC DESIGNS", which is expressly incorporated by reference in its entirety for all purposes.

At 226B, the method or system may generate a display for the analysis results in response to the request for displaying analysis results. The method or system may generate the display with textual, graphical, and/or both textual and graphical emphasis for the request. For example, the method or system may highlight the one or more circuit components that are identified in response to the request at 216B. The method or system may further associate textual, graphical, or both textual and graphical indications with some or all of these circuit components to indicate the availability of the analysis results. For example, the method or system may insert one or more icons (or other types of identifiers) on or in close proximity of a net in a representation of the multi-fabric electronic design to indicate that the analysis results for the net are available.

Figure 2D:
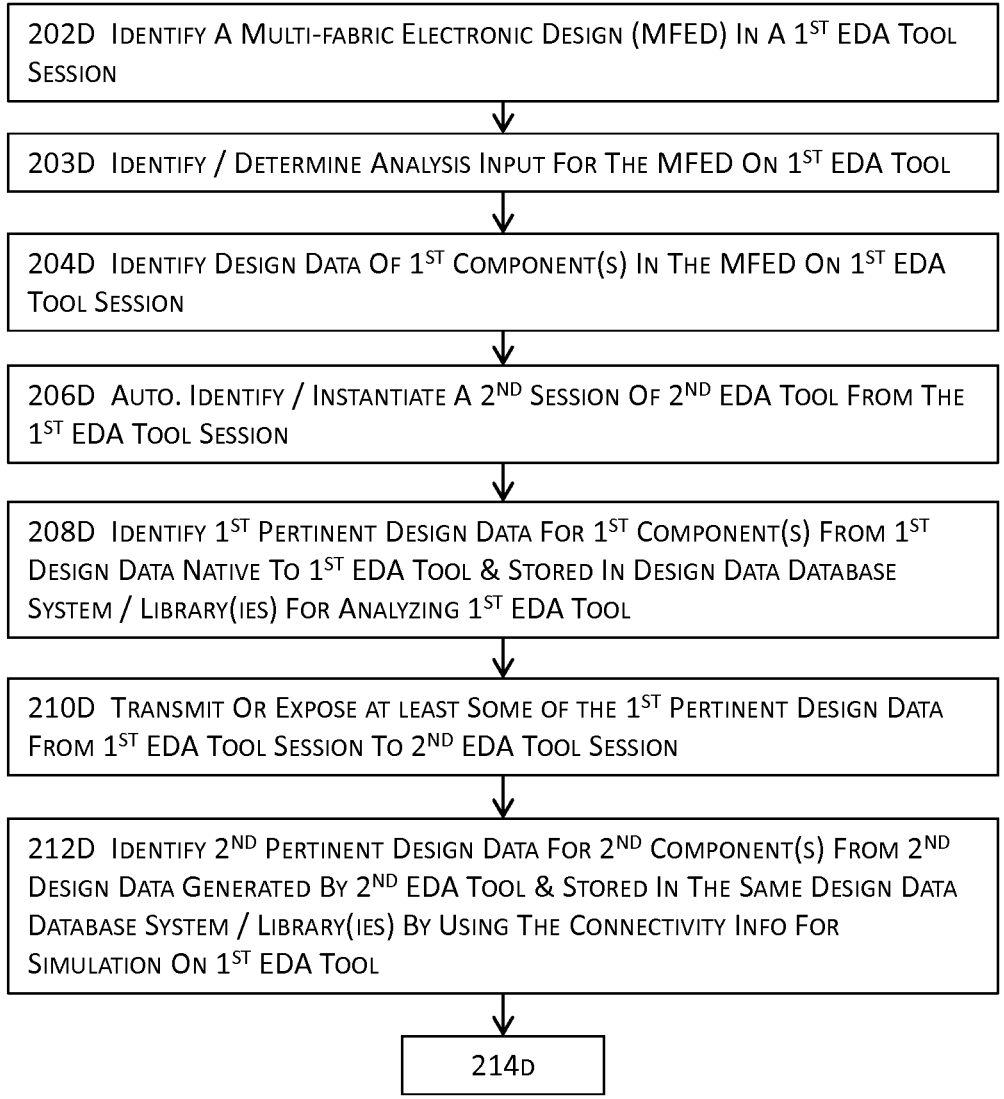
FIGS. 2D-F jointly illustrate a more detailed flow diagram of a method or system for analyzing a multi-fabric electronic design and viewing analysis results across multiple design fabrics in some embodiments.
Figure 2E:
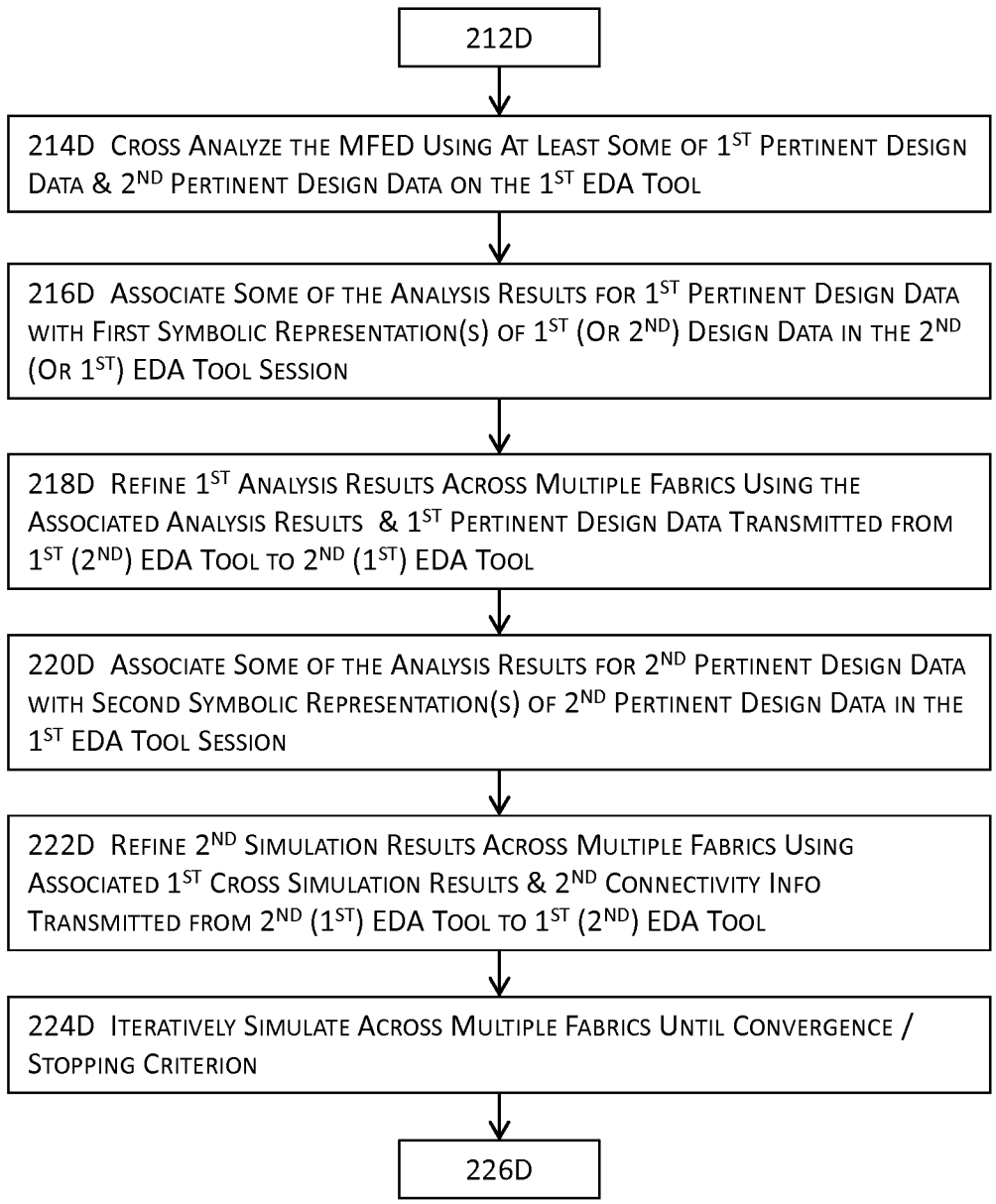
Figure 2F:
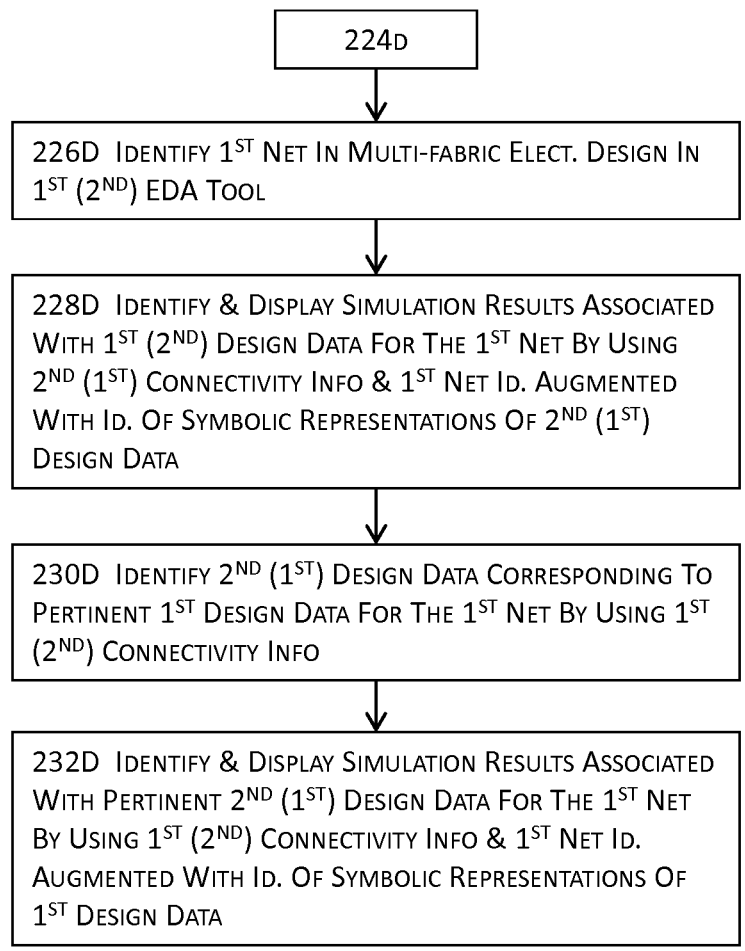

FIGS. 2D-F jointly illustrate a flow diagram of a method or system for analyzing or simulating a multi-fabric electronic design across multiple fabrics in some embodiments. In these embodiments, a multi-fabric electronic design may be analyzed or simulated across multiple design fabrics by creating a cross-fabric analysis model (e.g., a netlist or a model including one or more complex models for circuit components, etc.) for the multi-fabric electronic design in substantially similar manners as those described for FIGS. 2A-C, transmitting the created cross-fabric analysis model to an analysis engine (e.g., a simulator), and analyzing the multi-fabric electronic design by using the analysis engine. In some embodiments, the method or system may identify a multi-fabric electronic design in a first session of a first EDA tool at 202D. In some of these embodiments, the multi-fabric electronic design spans across multiple fabrics. The first session of the first EDA tool may be used to natively generate, edit, access, manipulate, or otherwise maintain the first design data in the first design fabric of the multiple fabrics; and a second session of the second EDA tool may be used to natively generate, edit, access, manipulate, or otherwise maintain the second design data in the second design fabric of the multiple fabrics.

At 203D, the method or system may identify or determine the input to an analysis engine for the multi-fabric electronic design. The input may comprise, for example but not limited to, initial conditions including one or more specified values or states of various characteristics or signals in electrical domain and/or physical domain (e.g., thermal analysis domain and mechanical analysis domain) that are first provided to the analysis engine to start the analysis for the multi-fabric electronic design in some embodiments. The input may also comprise boundary conditions including one or more specified values of various characteristics in electrical domain and/or physical domain that are provided to the analysis engine to prescribe the restraints for the multi-fabric electronic design in some embodiments.

At 204D, the method or system may identify first design data of one or more first circuit components in the first design fabric native to the first EDA tool. For example, the method or system may identify the schematic design data of one or more interconnects or one or more discrete components in the test bench fabric by using a schematic editor to which the schematic design data are native at 204D. In some embodiments, the one or more first circuit components may include the critical circuit components but not non-critical circuit components to avoid data explosion issues. In some other embodiments, the first circuit components may include both critical and non-critical circuit components. At 206D, the method or system may use the first session of the first EDA tool to automatically identify (if pre-existing) or instantiate (if non-existing) a second EDA tool instance based at least in part upon some of the first design data identified at 204D.

In the above example of a test bench in a test bench design fabric, the method or system or the first EDA tool may automatically identify a PCB design tool at 206D for a PCB, which is included in the test bench design as a symbolic representation. At 208D, the pertinent design data or information for the one or more first components may be identified from or for the first design data generated by and native to the first EDA tool. For example, the method or system may identify the first design data of a first net segment in the PCB design fabric leading to an IC package design at 204D and the connectivity of the first net segment as the first pertinent design data for the first net at 208D. In some of these embodiments, the first design data may be stored and managed in a design data database system or a library having one or more library files.

The method or system may then automatically identify and transmit at least some of the first pertinent design data from the first EDA tool to the second EDA tool at 210E. In the above example, the method or system may identify the connectivity information including the name, the source node, and destination node of the first net as the first pertinent design data at 208D, whether the destination node of the first net is connected to the IC package design. The method or system may then expose or transmit information about the destination node (e.g., the identification of the destination node and the name of the net) to the IC package design tool. In the alternative, the IC package design tool may also expose or transmit the connectivity information about the interface circuit components to the PCB design tool.

The first pertinent design data may be used to check whether interconnected circuit components in different design fabrics are correctly connected, although EDA tools can natively access only the design data native to the respective EDA tools. In some embodiments, the method or system may further establish a mapping between the interconnections that facilitate the interconnections across multiple design fabrics or even in different design domains across multiple design fabrics. For example, the method or system may establish a mapping between the connectivity between the logical, schematic, and layout domains of a test bench design fabric and the logical, schematic, and layout domains of a PCB design fabric such that the method or system may identify the corresponding identifications of a first circuit component in different domains for the first circuit component in a specific domain of a design fabric. The method or system may also reference the mapping to identify other circuit components connected to the first circuit component in one or more other design domains.

The first pertinent design data may include, for example, some connectivity information, one or more ports, pins, terminals, pads, or identifications thereof, information about one or more net segments, or any combinations thereof. Second pertinent design data for one or more second circuit components may be identified from a set of second design data that is native to the second EDA tool at 212D based at least in part upon the at least some of the first pertinent design data transmitted or exposed to the second session of the second EDA tool at 210D. In some embodiments, the set of second design data may be stored and managed by the same or different design data database system or library in various embodiments.

For example, the method may identify interconnections and discrete components in the test bench design fabric as the first design data at 208D. The method or system may, at 210D, transmit or expose some test bench connectivity information or identifications of ports or nets related the identified interconnections and discrete components to a PCB design tool instance that is identified or instantiated at 206D. The PCB design tool instance may then be used to identify the second pertinent design data of some PCB design components in the PCB design fabric at 212D by using at least the connectivity information exposed or transmitted to the PCB design tool session at 210D.

At 214D, the method or system may then cross-analyze the multi-fabric electronic design using at least some of the first pertinent design data and the second pertinent design data in the first EDA tool session across at least the first design fabric and the second design fabric. In some of these embodiments illustrated in FIGS. 2D-F, the method or system performs the cross-fabric analysis or simulation for a multi-fabric design by iteratively solving various designs in different design fabrics and further by passing intermediate solutions of these various designs in different design fabrics as updated input back and forth among these different fabrics.

For example, a simulator may simulate the test bench including the PCB design as a symbolic representation therein and simulate the PCB design using the intermediate solutions produced by the test bench design at the interface or boundary between the test bench design and the PCB design as input to the PCB design to obtain intermediate PCB design simulation results. The PCB design simulation results at the interface or boundary with the test bench may be in turn used as updated intermediate solutions to update the test bench simulation model to iteratively solve for another set of simulation results for the test bench design.

The method or system may thus iteratively solve the entire test bench design including the PCB design and other designs included therein until a point where the convergence criterion is satisfied or until a stopping criterion is triggered. During the cross analysis of the multi-fabric electronic design, the second design data may be represented as one or more second symbolic representations in the first EDA tool session which cannot natively access the second design data. Similarly, the first design data may be represented as one or more first symbolic representations in the second EDA tool session which cannot natively access the first design data.

At 216D, the method or system may associate at least a first part of the analysis results for the first pertinent design data with one or more first symbolic representations of the first pertinent design data in the second session of the second EDA tool. In addition or in the alternative, the method or system may associate at least a second part of the analysis results for the second pertinent design data with one or more second symbolic representations of the second pertinent design data in the first session of the first EDA tool. In the above example, the first design components in the test bench fabric may be represented as one or more first symbolic representations in the PCB design tool that has the native capability to access the second design data of the second design components in the PCB design fabric but does not have the native capability to access the first design data in the test bench design fabric. Therefore, at least a part of the analysis results (e.g., the simulation results for the interface between the test bench fabric and the PCB design fabric) for the first design components in the test bench fabric may be associated with or attached to the first symbolic representations of these first design components in the PCB design fabric.

Similarly, the second design components in the PCB design fabric may be represented as one or more second symbolic representations in the first EDA tool (e.g., an IC schematic editor) that has the native capability to access the first design data of the first design components in the test bench design fabric but does not have the native capability to access the second design data of the second design components in the PCB design fabric. Therefore, at least a part of the analysis results (e.g., the simulation results for the interface between the test bench fabric and the PCB design fabric) for the second design components in the PCB design fabric may be associated with or attached to the second symbolic representations of these second design components in the first design fabric (e.g., the test bench design fabric).

At 218D, the method or system may further refine the cross-fabric analysis results across multiple fabrics by using at least the first part of the analysis results associated with the one or more first symbolic representation or the second part of the analysis results associated with the one or more second symbolic representation. At 220D, the method or system may associate at least some of the analysis results for the second pertinent design data with one or more second symbolic representations of the second pertinent design data in the first session of the first EDA tool. In addition or in the alternative, the method or system may further refine the cross-fabric analysis results across multiple fabrics by using the first pertinent design data and/or the second pertinent design data at 222D. In some embodiments where the first design data in the first design fabric and the second design data in the second are separately simulated in two parallel or sequential instances, at least a part of the analysis results (e.g., the simulation results at the interfaces) for design data in one design fabric may be associated with the symbolic representation(s) of the design data in another fabric, and vice versa.

At 220D, the method or system may identify and associate the first analysis results for the second pertinent design data with the one or more second symbolic representations of the second design data in the first EDA tool session. For example, the analysis results for the interface of the PCB design may be associated with a symbolic representation of the PCB design in the test bench design. As another example, the analysis results for the interface of an IC packaging design may be associated with a symbolic representation of the IC packaging design in the PCB design. As yet another example, the analysis results for the interface of a die design may be associated with a symbolic representation of the die design in the IC packaging design.

At 222D, the second analysis results across multiple fabrics may also be refined based at least in part upon the first analysis results and the second pertinent design data transmitted from the second EDA tool session to the first EDA tool session. In these embodiments, the analysis results of different blocks or modules in different design fabrics may be associated with the symbolic representations used in other design fabric(s) to provide more refined or more accurate values than, for example, the values prescribed in the initial conditions or the boundary conditions. At 224D, the method or system may then iteratively analyze the multi-fabric electronic design in the first EDA tool session across multiple design fabrics until a convergence criterion is satisfied or an iteration stopping criterion is triggered.

At 226D, the method or system may identify a first net in the multi-fabric electronic design in the first EDA tool. The method or system may then identify, retrieve, or display the cross-fabric analysis results associated with the first design data of the first net at 228D. In some of these illustrated embodiments, the method or system may identify, retrieve, or display such analysis results by using at least the second pertinent design data (e.g., the exposed connectivity) and the identification of the first net (e.g., the name of the first net). In addition or in the alternative, the second pertinent design data or the identification of the first net may further be augmented to include or be accompanied by the one or more identifications of the corresponding one or more symbolic representations of the second design data associated with the first net in a second design fabric. At 230D, the method or system may identify the second design data in the second design fabric corresponding to the first design data in the first design fabric for the first net by using the first connectivity information in the first design fabric of the multi-fabric electronic design.

The method or system may then identify, retrieve, or display the simulation results associated with the second pertinent design data of the first net in the second design fabric by using the first connectivity information. In some of these embodiments, the first connectivity information may also be augmented to include or accompanied by the identification of the first net or one or more identifications of one or more sub-nets therefor. In addition or in the alternative, the first connectivity information may also be augmented to include or accompanied by the one or more identifications of the corresponding one or more symbolic views of the first design data. For example, the method or system may perform the cross-fabric simulation for the illustrated test bench design illustrated in FIG. 3A.

Figure 3A:
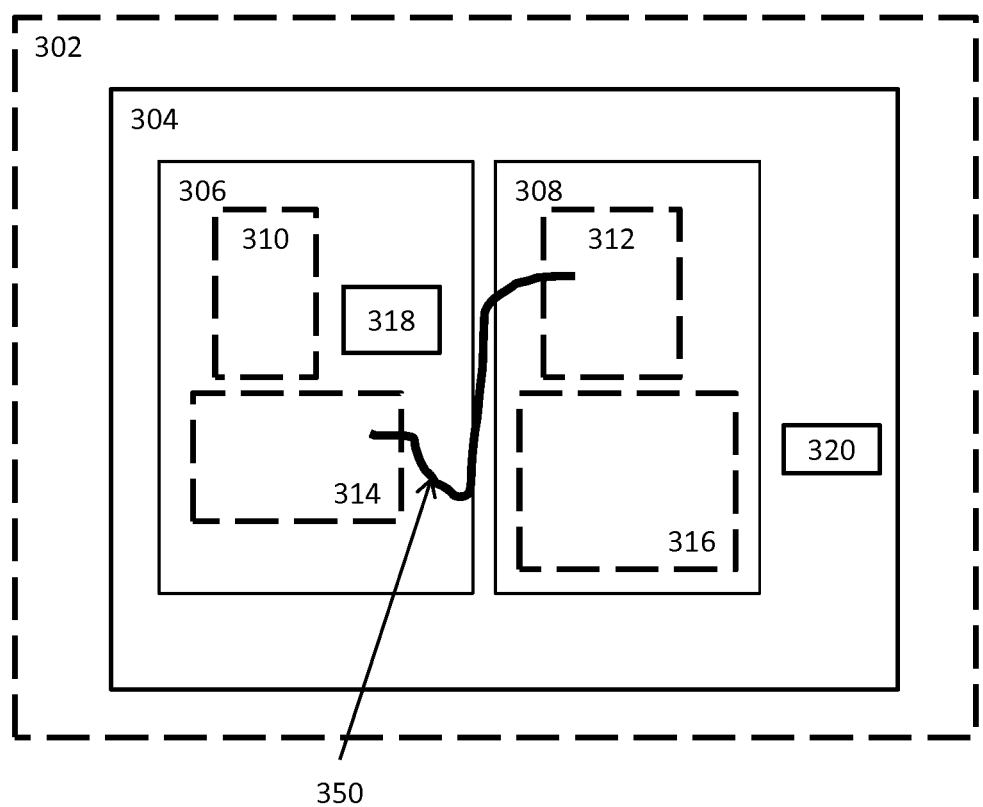
FIG. 3A illustrates a simplified schematic illustration of a multi-fabric electronic design in some embodiments.

FIG. 3A further illustrates that the printed circuit board design 304 includes an interconnect 350 connects a first point within the second IC design 314 and a second point within the third IC design 312. The interconnect 350 crosses the boundary of the second IC design 314 in the IC design fabric, the boundary of the IC packaging design 306 in the IC packaging design fabric into the PCB design fabric, the boundary of IC packaging design 308 in the IC packaging design fabric, and the boundary of the third IC design 312 in the IC design fabric. Once the cross-fabric simulation results have been obtained, the method or system may display the simulation results for the interconnect 350, although interconnect 350 spans across multiple design fabrics.

For example, the user may identify interconnect 350 by, for example, click on any part of the interconnect in any design fabric either in the graphic user interface showing the portion of the multi-fabric electronic design including the part of the interconnect or in an expandable and collapsible, textual tree structure of the multi-fabric electronic design in a hierarchical and/or fabric-specific manner. The user may further optionally specify what level of simulation results is to be retrieved or displayed for which part of the interconnect 350. For example, the user may specify to see the simulation results for the interconnect segment of the interconnect 350 in only the PCB fabric or only the interconnect segment at the IC packaging design hierarchical level. If the user does not specify the level of simulation results to be displayed, the method or system may retrieve and display the default level of simulation results.

For example, the method or system may retrieve and display only the simulation results in the fabric and at the hierarchical level that correspond to the part of the interconnect being identified by the user in some embodiments. As another example, the method or system may retrieve and display the entire simulation results for the entire interconnect in all of the fabrics and all of the hierarchical levels across which the interconnect spans in some other embodiments. In response to the user's identification of the interconnect 350 and optionally on the user's specification of the level of simulation results, the method or system may identify appropriate connectivity information for the identified interconnect in the desired fabrics and/or at the desired hierarchical level, and use the appropriate connectivity information to retrieve the corresponding simulation results for display in a user interface.

FIG. 3A illustrates a simplified representation of an electronic design in some embodiments. In these embodiments, the simplified representation of electronic design includes the test bench 302 at a first hierarchical level. The test bench 302 may further include a representation (e.g., a symbolic representation) of the printed circuit board 304 at a second hierarchical level. The test bench 302 may also include multiple interconnects from, for example, various power or ground rails to the printed circuit board 304. The printed circuit board 304 may also include a discrete component 320 situated at a third hierarchical level with the two IC packaging. The printed circuit board 304 may include the first IC packaging 306 and the second IC packaging 308 situated at a third hierarchical level, both of which may also be represented in one or more representations (e.g., a symbolic representation or schematic representation).

The first IC packaging 306 may include a second IC 314 and a first IC 310 that further includes a discrete component 318. The second IC packaging 308 may also include a third IC 312 and a fourth IC 316 situated at a fourth hierarchical level as the first IC 310 and the second IC 314. In some embodiments, one or more integrated circuit design EDA tools (e.g., an IC schematic editor, IC layout tool, etc.) may be used to generate, modify, or otherwise access the design data of the integrated circuit designs 310, 314, 312, and 316, whereas IC packaging design tools or printed circuit board design tools only receive symbolic representations of these integrated circuit designs. In these embodiments, IC packaging design tools may be used to generate, modify, or otherwise access the design data (e.g., schematic design data, physical design data, etc.) of the IC packaging designs 306 and 308, whereas the one or more integrated circuit design EDA tools and the printed circuit board design tools may only receive symbolic representations of the IC packaging 306 and 308.

In these embodiments illustrated in FIG. 3A, the printed circuit board design 304 also includes an interconnect that connects the second IC 314 and the third IC 312 across the boundaries of the first IC packaging 306 and the second IC packaging 308. Moreover, one or more printed circuit board design tools may be used to generate, modify, or otherwise access the design data (e.g., schematic or physical design data) of the printed circuit board, whereas the one or more IC design EDA tools and the IC packaging design tools may only receive a symbolic representation of the printed circuit board design.

The test bench design including the integrated circuit designs, the IC packaging designs, the printed circuit boards, one or more discrete components, and interconnections at the test bench level may be implemented in an integrated circuit design tool (e.g., an IC schematic tool for editing and/or simulating schematic designs of integrated circuit designs or for transmitting to and receiving from the physical designs, etc. or an IC layout tool for implementing or modifying layouts of or analyzing integrated circuit designs) because IC design tools have gone through extensive development and often includes various design environments or tools such as schematic editors, analog design tools, layout tools, RF design tools, various simulators (e.g., SPICE or SPICE-like simulators) as well as various libraries.

Integrated circuit design tools are also well integrated with post-layout verification and closure tools and may thus provide more functionalities and diverse capabilities than printed circuit board design tools or IC packaging design tools. FIG. 3A further illustrates that the printed circuit board design 304 includes an interconnect 350 connects a first point within the second IC design 314 and a second point within the third IC design 312. The interconnect 350 crosses the boundary of the second IC design 314 in the IC design fabric, the boundary of the IC packaging design 306 in the IC packaging design fabric into the PCB design fabric, the boundary of IC packaging design 308 in the IC packaging design fabric, and the boundary of the third IC design 312 in the IC design fabric.

Figure 3B:
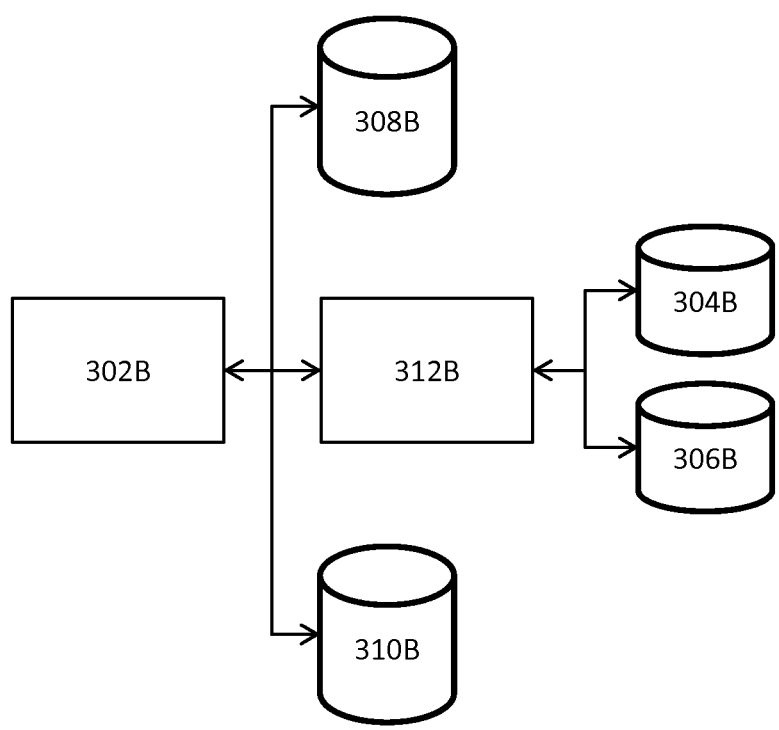
FIG. 3B illustrates a cluster of computing systems that may be used to implement various techniques and methodologies for a multi-fabric design environment described herein in some embodiments.

FIG. 3B illustrates a cluster of computing systems that may be used to implement various techniques and methodologies for a multi-fabric design environment described herein in some embodiments. The multi-fabric design environment may include the test bench fabric, the printed circuit board and packaging fabric, and the die fabric. In some of these embodiments, the multi-fabric design environment may include an IC packaging fabric and a printed circuit board fabric. The multi-fabric design environment may include one or more test bench design databases 308B in the test bench fabric, one or more IC design databases 310B in the die fabric, one or more IC packaging design databases 304B and one or more printed circuit board design data databases 306B in the fabric.

In some embodiments where the multi-fabric design environment includes a printed circuit board fabric and a separate IC packaging fabric, the multi-fabric design environment may include one or more IC packaging design data databases 304B in the IC packaging fabric and one or more PCB design data databases 306B in the PCB fabric. The multi-fabric design environment may further include one or more IC design tools (e.g., 302B) such as an IC schematic suite or an IC layout suite for manipulating the native schematic or physical design data of integrated circuit designs in the die fabric. The multi-fabric design environment may also include one or more PCB design tools (e.g., 312B) for manipulating the native schematic or physical design data of PCB designs in the PCB/IC packaging fabric or in the dedicated PCB fabric. The multi-fabric design environment may also include one or more IC packaging design tools (e.g., 312B) for manipulating the native schematic or physical design data of IC packaging designs in the PCB/IC packaging fabric 316B or in the dedicated IC packaging fabric.

Figure 3C:
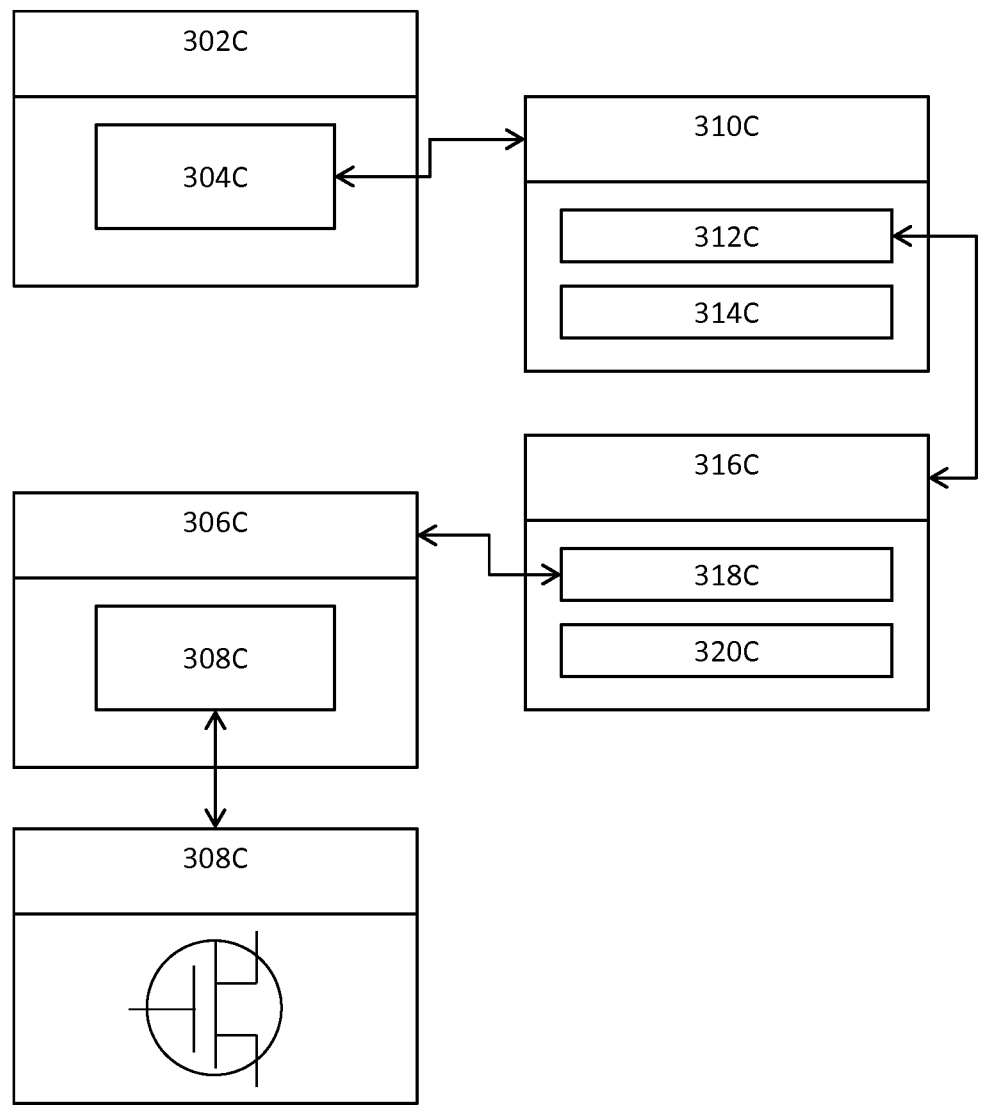
FIG. 3C illustrates a simplified test bench design including various instances to which various techniques and methodologies apply in some embodiments.

FIG. 3C illustrates a simplified test bench design including various instances to which various techniques and methodologies apply in some embodiments. More specifically, the simplified test bench design may include, at the first hierarchical level, the test bench design 302C including an instance 304C of a printed circuit board on a first EDA tool. The test bench design 302C may be implemented in one or more IC design tool such as an integrated circuit schematic suite or an integrated circuit layout suite to leverage the more complete and advanced editing, simulation, and/or analysis capabilities of such design tools and also to leverage the better integrated verification and/or design closure tools such as various post-layout verification tools. The test bench design 302C may exist in the test bench fabric and includes the symbolic view of the PCB design. When specific design data in the instance 304C of the PCB are inquired into or needed, the first EDA tool may identify or initiate an instance of a second EDA tool that is built to manipulate the native design data of PCB designs.

The second EDA tool may open the pertinent design data or a view 310C including the pertinent design data of the instance 304C of the PCB. The method or system described herein may further establish a correlation or link between the pertinent design data or view 310C of the PCB and the instance 304C of the PCB in the test bench 302C by using, for example a data structure to store the correlation or link. The second EDA tool may thus load the pertinent design data or view 310C that further includes a symbolic views of a first IC packaging design 312C and a symbolic view of a second IC packaging design 314C. The PCB design 310C may thus exist in the PCB fabric including symbolic views of IC packaging designs. When the design data of the IC packaging designs (e.g., 312C or 314C) are needed, the method or system may further identify or instantiate a third EDA tool (e.g., an IC packaging design tool) to load, for example, the pertinent design data or view 316C of IC packaging design 312C.

The third EDA tool may load the pertinent design data or view 316C that further includes a first die design 318C and a second die design 320C. The pertinent design data or view 316C of the IC packaging design 312C may exist in the IC packaging fabric and thus includes only the symbolic views of the die designs 318C and 320C. When the design data (e.g., schematic design data or layout data) of the die design (e.g., the first die design 318C) are needed, the third EDA tool may identify or instantiate the appropriate EDA tool (e.g., the IC schematic tool or IC layout tool) to open the pertinent design data or view (e.g., 306C) for the die design (e.g., 318C). In these embodiments illustrated in FIG. 3C, the pertinent design data or view 306C for the symbolic view 318C of the first die design includes further details of the design (e.g., schematic design of a field effect oxide or FET as shown in 308C) in the IC design fabric.

System Architecture Overview

Figure 4:
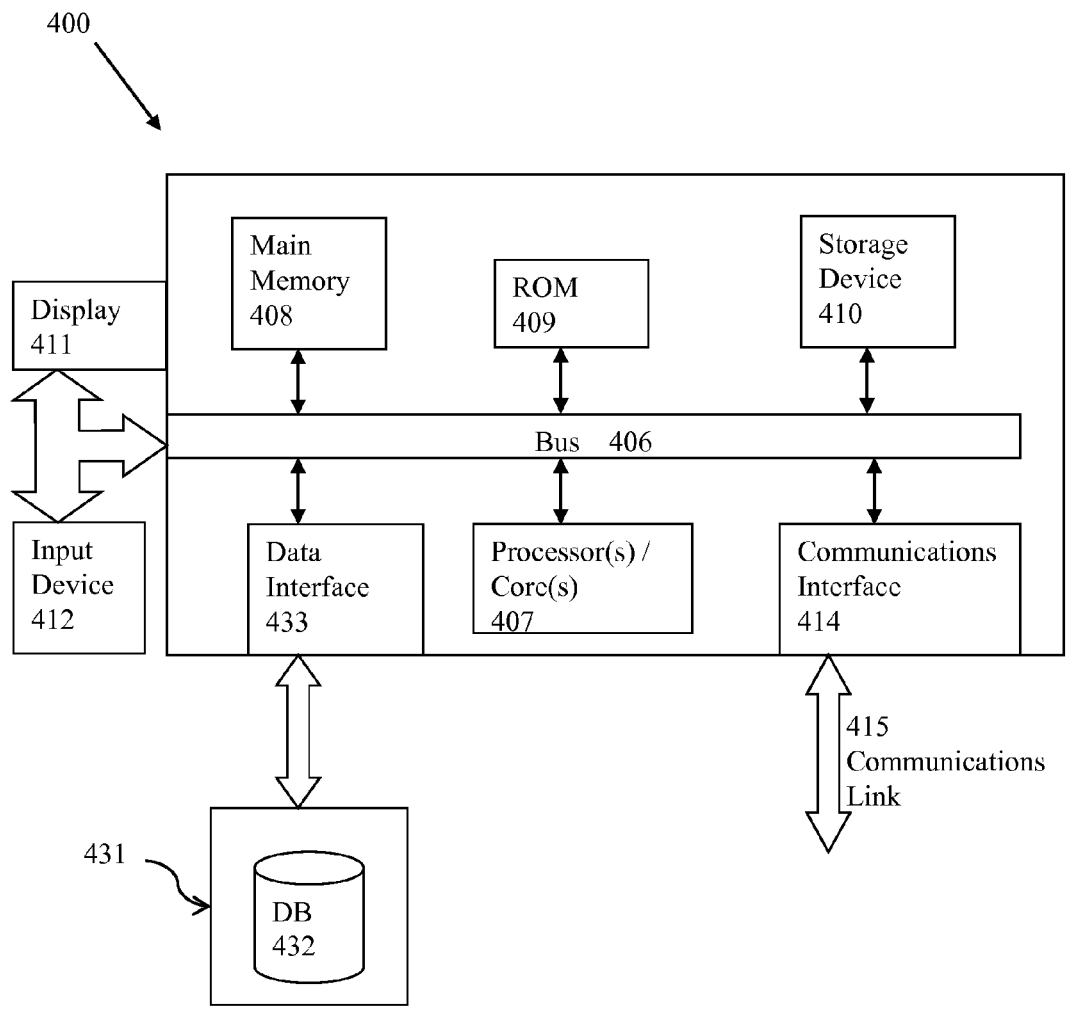
FIG. 4 illustrates a computerized system on which a method for analyzing a multi-fabric electronic design and viewing analysis results across multiple design fabrics may be implemented.

FIG. 4 illustrates a computerized system on which a method for analyzing a multi-fabric electronic design and viewing analysis results across multiple design fabrics as described in the preceding paragraphs with reference to various figures. Computer system 400 includes a bus 406 or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown).

According to one embodiment, computer system 400 performs specific operations by one or more processor or processor cores 407 executing one or more sequences of one or more instructions contained in system memory 408. Such instructions may be read into system memory 408 from another computer readable/usable storage medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 407, where the one or more processors, one or more processor cores, or combination thereof executes one or more threads. For example, the act of specifying various net or terminal sets or the act or module of performing verification, simulation, design checking, netlisting, probing, simulations, analyses, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 407 for execution. Such a medium may take many forms, including but not limited to, non-volatile media and volatile media. Non-volatile media includes, for example, optical or magnetic disks, such as disk drive 410. Volatile media includes dynamic memory, such as system memory 408. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. In an embodiment, the computer system 400 operates in conjunction with a data storage system 431, e.g., a data storage system 431 that includes a database 432 that is readily accessible by the computer system 400. The computer system 400 communicates with the data storage system 431 through a data interface 433. A data interface 433, which is coupled to the bus 406 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 433 may be performed by the communication interface 414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for analyzing a multi-fabric design across multiple design fabrics in a multi-fabric design environment, comprising:
   executing a sequence of instructions by using a processor or processor core executing one or more threads of a computing system to perform a process, the process comprising:
   generating a cross-fabric analysis model by at least identifying first design data in a first design fabric of a multi-fabric electronic design using a first session of a first electronic design automation (EDA) tool;
   updating the cross-fabric analysis model by at least identifying second design data in a second design fabric using a second session of a second EDA tool; and
   determining analysis results for the multi-fabric electronic design using at least the cross-fabric analysis model including one or more symbolic views.

2. The computer implemented method of claim 1, the process further comprising:
   determining information for the multi-fabric electronic design in response to a request for determining the analysis results, wherein the information includes at least parasitic information, electrical information, or performance information.

3. The computer implemented method of claim 2, the process further comprising:
   updating the cross-fabric analysis model based at least in part upon the information, wherein
   the first design data are native to the first EDA tool and non-native to the second EDA tool, and
   the second design data are native to the second EDA tool and non-native to the first EDA tool.

4. The computer implemented method of claim 1, wherein the second design data are non-native to and cannot be accessed by the first EDA tool without transforming the second design data, and the first design data are non-native to and cannot be accessed by the second EDA tool without transforming the first design data.

5. The computer implemented method of claim 1, wherein the first EDA tool has no visibility of the second design data in the second design fabric, and the second EDA tool has no visibility of the first design data in the first design fabric.

6. The computer implemented method of claim 1, wherein the multi-fabric electronic design does not satisfy one or more design rules or constraints before the request for processing the multi-fabric electronic design is fulfilled, and the multi-fabric electronic design includes a partial, incomplete design that includes no design data for at least one design component.

7. The computer implemented method of claim 1, the process further comprising:
   receiving a request for determining the analysis results for the multi-fabric electronic design or a portion thereof; and
   analyzing the multi-fabric electronic design or the portion thereof by using the cross-fabric analysis model in response to the request.

8. The computer implemented method of claim 1, the process further comprising:
   receiving a request for displaying the analysis results for the multi-fabric electronic design; and
   identifying one or more circuit components across multiple design fabrics in the multi-fabric electronic design in response to the request for displaying the analysis results.

9. The computer implemented method of claim 8, the process further comprising:
   determining at least one model for the one or more circuit components, wherein the at least one model comprises a complex model.

10. The computer implemented method of claim 9, the process further comprising:
    determining an analysis profile for the at least one model or the one or more circuit components; and
    identifying the analysis results that are associated with the one or more circuit components or with the at least one model by using at least the profile.

11. The computer implemented method of claim 8, the process further comprising:
    identifying the analysis results for the one or more circuit components by using the first EDA tool and the second EDA tool; and
    generating a display for at least a part of the analysis results in response to the request for displaying the analysis results.

12. The computer implemented method of claim 1, the process further comprising:
    identifying first pertinent design data for the first design data native to the first session of the first EDA tool;
    identifying second pertinent design data for the second design data native to the second session of the second EDA tool; and
    transmitting or exposing at least a part of the first pertinent design data from the first session of the first EDA tool to the second session of the second EDA tool or at least a part of the second pertinent design data from the second session of the second EDA tool to the first session of the first EDA tool.

13. The computer implemented method of claim 12, the process further comprising:
    cross analyzing the multi-fabric electronic design by using at least some of the first pertinent design data and the second pertinent design data;
    associating at least a first part of the analysis results for the first pertinent design data with one or more first symbolic representations of the first pertinent design data in the second session of the second EDA tool; and
    associating at least a second part of the analysis results for the second pertinent design data with one or more second symbolic representations of the second pertinent design data in the first session of the first EDA tool.

14. The computer implemented method of claim 12, the process further comprising:
    refining at least a first part of the analysis results in the first design fabric and/or the second design fabric by using at least the first part of the analysis result associated with the one or more first symbolic representations based at least in part upon the first pertinent design data and the second pertinent design data; and
    refining at least a second part of the analysis results in the first design fabric and/or the second design fabric by using at least the second part of the analysis result associated with the one or more second symbolic representations based at least in part upon the first pertinent design data and the second pertinent design data.

15. An article of manufacture comprising a non-transitory computer accessible storage medium having stored thereupon a sequence of instructions which, when executed by at least one processor or at least one processor core executing one or more threads, causes the at least one processor or the at least one processor core to perform a process for analyzing a multi-fabric design across multiple design fabrics in a multi-fabric design environment, the process comprising:
    generating a cross-fabric analysis model by at least identifying first design data in a first design fabric of a multi-fabric electronic design using a first session of a first electronic design automation (EDA) tool;
    updating the cross-fabric analysis model by at least identifying second design data in a second design fabric using a second session of a second EDA tool; and
    determining analysis results for the multi-fabric electronic design using at least the cross-fabric analysis model including one or more symbolic views.

16. The article of manufacture of claim 15, the process further comprising:
    determining information for the multi-fabric electronic design in response to a request for determining the analysis results, wherein the information includes at least parasitic information, electrical information, or performance information; and
    updating the cross-fabric analysis model based at least in part upon the information, wherein
      the first design data are native to the first EDA tool and non-native to the second EDA tool, and
      the second design data are native to the second EDA tool and non-native to the first EDA tool.

17. The article of manufacture of claim 15, the process further comprising at least one of:
    a first sub-process, comprising:
      receiving a request for displaying the analysis results for the multi-fabric electronic design; and
      identifying one or more circuit components across multiple design fabrics in the multi-fabric electronic design in response to the request for displaying the analysis results;
    a second sub-process, comprising:

determining an analysis profile for the at least one model or the one or more circuit components;

identifying the analysis results that are associated with the one or more circuit components or with the at least one model by using at least the profile;

identifying the analysis results for the one or more circuit components by using the first EDA tool and the second EDA tool; and generating a display for at least a part of the analysis results in response to the request for displaying the analysis results.

18. A system for analyzing a multi-fabric design across multiple design fabrics in a multi-fabric design environment, comprising:

non-transitory computer accessible storage medium storing thereupon program code; and at least one processor executing the program code to: generate a cross-fabric analysis model by at least identifying first design data in a first design fabric of a multi-fabric electronic design using a first session of a first electronic design automation (EDA) tool, update the cross-fabric analysis model by at least identifying second design data in a second design fabric using a second session of a second EDA tool, and determine analysis results for the multi-fabric electronic design using at least the cross-fabric analysis model including one or more symbolic views.

19. The system of claim 18, the at least one processor further executing the program code to determine information for the multi-fabric electronic design in response to a request for determining the analysis results, wherein the information includes at least parasitic information, electrical information, or performance information, and update the cross-fabric analysis model based at least in part upon the information, wherein the first design data are native to the first EDA tool and non-native to the second EDA tool, and the second design data are native to the second EDA tool and non-native to the first EDA tool.

20. The system of claim 18, the at least one processor further executing the program code to receive a request for displaying the analysis results for the multi-fabric electronic design, and identify one or more circuit components across multiple design fabrics in the multi-fabric electronic design in response to the request for displaying the analysis results or to determine an analysis profile for the at least one model or the one or more circuit components, identify the analysis results that are associated with the one or more circuit components or with the at least one model by using at least the profile, identify the analysis results for the one or more circuit components by using the first EDA tool and the second EDA tool, and generate a display for at least a part of the analysis results in response to the request for displaying the analysis results.

* * * * *